US010030885B1

(12) United States Patent
Yu

(10) Patent No.: US 10,030,885 B1
(45) Date of Patent: Jul. 24, 2018

(54) SMART REGISTER DEVICE AND METHOD

(71) Applicant: Chengfu Yu, Irvine, CA (US)

(72) Inventor: Chengfu Yu, Irvine, CA (US)

(*) Notice: Subject to any disclaimer, the term of this patent is extended or adjusted under 35 U.S.C. 154(b) by 0 days.

(21) Appl. No.: 15/620,749

(22) Filed: Jun. 12, 2017

(51) Int. Cl.
F24F 11/70 (2018.01)
F24F 11/00 (2018.01)
G05B 15/02 (2006.01)
F24F 11/30 (2018.01)
F24F 11/62 (2018.01)
H04W 84/12 (2009.01)
F24F 11/56 (2018.01)
F24F 11/64 (2018.01)
F24F 120/12 (2018.01)
F24F 120/10 (2018.01)

(52) U.S. Cl.
CPC .......... F24F 11/70 (2018.01); F24F 11/0001 (2013.01); F24F 11/006 (2013.01); F24F 11/0034 (2013.01); F24F 11/0076 (2013.01); F24F 11/30 (2018.01); F24F 11/62 (2018.01); G05B 15/02 (2013.01); F24F 11/56 (2018.01); F24F 11/64 (2018.01); F24F 2011/0035 (2013.01); F24F 2011/0063 (2013.01); F24F 2011/0068 (2013.01); F24F 2120/10 (2018.01); F24F 2120/12 (2018.01); H04W 84/12 (2013.01)

(58) Field of Classification Search
CPC .............. F24F 11/0076; F24F 11/0001; F24F 11/0034; F24F 11/006; F24F 2011/0035; F24F 2011/0063; F24F 2011/0068; G05B 15/02; H04W 84/12
See application file for complete search history.

(56) References Cited

U.S. PATENT DOCUMENTS

| 2010/0057259 A1* | 3/2010 | Dawson | G05B 15/02 700/278 |
| 2013/0163083 A1* | 6/2013 | Cheng | G03B 11/043 359/511 |
| 2015/0133043 A1 | 5/2015 | Patel et al. | |
| 2016/0091220 A1 | 3/2016 | Kates | |
| 2016/0091471 A1* | 3/2016 | Benn | G01K 13/00 702/24 |
| 2016/0137028 A1* | 5/2016 | Trego | B60H 1/00742 165/203 |
| 2016/0153674 A1* | 6/2016 | Lancaster | F24F 11/006 700/276 |
| 2016/0195856 A1* | 7/2016 | Spero | G06N 5/046 700/90 |

(Continued)

Primary Examiner — Kenneth M Lo
Assistant Examiner — Michael J Huntley
(74) Attorney, Agent, or Firm — Arman Khosraviani

(57) ABSTRACT

A Smart Register Vent ("SRV") device having at least one memory configured to store instructions, a processor coupled to the at least one memory, at least one electronically adjustable louver, the processor configured to cause the at least one louver to move based on instructions stored on the at least one memory, a network module configured to couple the SRV device to a local wireless network, and at least one sensor for detecting environmental conditions and features and enabling image recognition technology or voice recognition technology, the SRV may include a magnetically couplable faceplate for attaching register faceplates of various colors and designs, a sensor cover, and a magnetic body or plate for coupling to a wall or ceiling.

23 Claims, 10 Drawing Sheets

(56) References Cited

U.S. PATENT DOCUMENTS

| | | | |
|---|---|---|---|
| 2016/0377305 A1* | 12/2016 | Kwa | F24F 11/006 |
| | | | 700/277 |
| 2017/0030605 A1* | 2/2017 | Heller | F24F 11/0012 |
| 2017/0130978 A1* | 5/2017 | Edwards | F24F 11/006 |
| 2017/0176034 A1* | 6/2017 | Hussain | F24F 11/006 |
| 2017/0219234 A1* | 8/2017 | Bhide | F24F 11/006 |

* cited by examiner

SMART REGISTER DEVICE AND METHOD

CROSS-REFERENCE TO RELATED APPLICATIONS

The entire contents of the following applications are incorporated herein by reference: U.S. Nonprovisional patent application Ser. No. 15/386,670; filed on Dec. 21, 2016; and entitled AUTONOMOUS PAIRING OF INTERNET OF THINGS DEVICES. U.S. Nonprovisional patent application Ser. No. 15/454,446; filed on Mar. 9, 2017; and entitled DUAL VIDEO SIGNAL MONITORING AND MANAGEMENT OF A PERSONAL INTERNET PROTOCOL SURVEILLANCE CAMERA. Nonprovisional patent application Ser. No. 15/488,211 filed on Apr. 14, 2017; and entitled AN INTERACTIVE AUGMENTED-REALITY IoT DEVICES SYSTEMS AND METHODS. Nonprovisional patent application Ser. No. 15/490,826 filed on Apr. 18, 2017; and entitled GARAGE DOOR CONTROLLER AND MONITORING SYSTEM AND METHOD

FIELD

The present disclosure generally relates to monitoring and controlling environmental conditions in a structure, and more particularly, to adjusting airflow from a common environmental control system in a structure.

BACKGROUND

There is a desire for users to have more control over environmental conditions in a building, home, or structure. Users may benefit from an automated, cost effective, and convenient control of cooling, heating, and ventilation within their building or home.

SUMMARY

The disclosed subject matter relates to a Smart Register Vent (hereinafter, "SRV") device and method. The SRV device having at least one memory, a processor coupled to the at least one memory, and one or more electronically adjustable louvers. The processor is configured to cause the one or more louvers to move based on instructions stored on the at least one memory, and a network module coupling the SRV device to a local wireless network.

The SRV device further includes one or more sensors including one of a speaker, a microphone, a camera, or a motion sensor, and the one or more sensors acquire space information or individual information of a surrounding environment to enable image recognition technology or voice recognition technology.

The SRV device may further be communicably coupled to a remote computing device, a server, or one or more other SRV devices. The server being communicably coupled to the local wireless network, and the server, remote computing device, or the one or more other SRV devices may provide the processor of the SRV device with further instructions on controlling the one or more louvers.

The SRV device may further include a sensor cover for covering the one or more sensors, wherein the processor instructs the sensor cover to move to cover the one or more sensors.

The SRV device further includes one or more louvers positioned along a vertical, a horizontal direction, or angled direction of the SRV. The SRV device may have two or more vertical louvers arranged along a first direction, and two or more horizontal louvers arranged along a second direction perpendicular to the first direction, and two or more diagonal louvers arranged along a third direction diagonal to the first direction and/or second direction. The one or more horizontal, vertical, and angled louvers are communicably coupled to the processor and configured to direct airflow into a space based on collected information from the one or more sensors, thermostat, server, or remote computing device.

The one or more sensors of the SRV device may be configured to detect at least one of a space information or an individual information in a space; the individual information includes one of the following: size, build, temperature, and number of individuals in the space, and the space information includes of at least one of the following: furniture type and location, SRV installation location, status and location of windows and doors, openings and cavities in the surrounding environment. The space information and the individual information collected by the one or more sensors of the SRV device are compared against a database of stored space information and individual information on the server or an at least one memory of the SRV device.

The individual and space information collected from the surrounding environment by the one or more sensors, thermostat, server, and remote computing device may be used to update the database; and a user may be prompted to approve updating of the database with the space information acquired by the one or more sensors. Further, the space and individual information acquired by the one or more sensors may be compared to user preferences stored in the database prior to moving the one or more louvers of the SRV device.

The SRV device may further include a magnetic faceplate coupled to the front face of the SRV, and at least one of the one or more sensors may be integrated within the SRV device.

The disclosed subject matter further relates to a method of detecting, by one or more sensors, a first action within a surrounding environment, communicating the first action to one or more SRV devices; and performing a second action, by one or more SRV devices, based on the detecting. The second action may be at least one of moving one or more louvers of the SRV device to an open position, a closed position, a partially open position or partially closed position. Detection of the first action within the surrounding environment may use at least one of image recognition technology or voice recognition technology.

The method further relates to acquiring at least one of a space information and an individual information from a surrounding environment; wherein the individual information comprises of at least one of the following: size, build, temperature, and number of individuals in the space, and wherein the space information comprises of at least one of the following: furniture type and location, SRV installation location, status and location of windows and doors, openings and cavities in the surrounding environment. The space and individual information acquired by the one or more sensors may be compared to a stored space and individual information in a database. The space and individual information acquired by the one or more sensors may further be stored in the database to update the database or used to create one or more databases. The database may be stored on a server or an at least one memory of the SRV device.

The method further relates to comparing the at least one of the space and individual information to user preferences stored in the database prior to performing the second action. The second action may include moving the one or more louvers of one or more SRV devices to point towards a window or door. The space and individual information in the database may be updated with the space and individual information acquired by the one or more sensors and user preferences. The user may be prompted to approve updating of the database with the acquired space information of surrounding environment.

The method further relates to using one or more sensors integrated within one or more SRV devices.

It is understood that other configurations of the present disclosure will become readily apparent to those skilled in the art from the following detailed description, wherein various configurations of the present disclosure are shown and described by way of illustration. As will be realized, the present disclosure of other different configurations and its several details are capable of modifications in various other respects, all without departing from the subject technology. Accordingly, the drawings and the detailed description are to be regarded as illustrative in nature and not restrictive.

BRIEF DESCRIPTION OF THE DRAWINGS

Certain features of the present disclosure are set forth in the appended claims. However, for purpose of explanation, several implementations of the present disclosure are set forth in the following figures.

Figure 1:
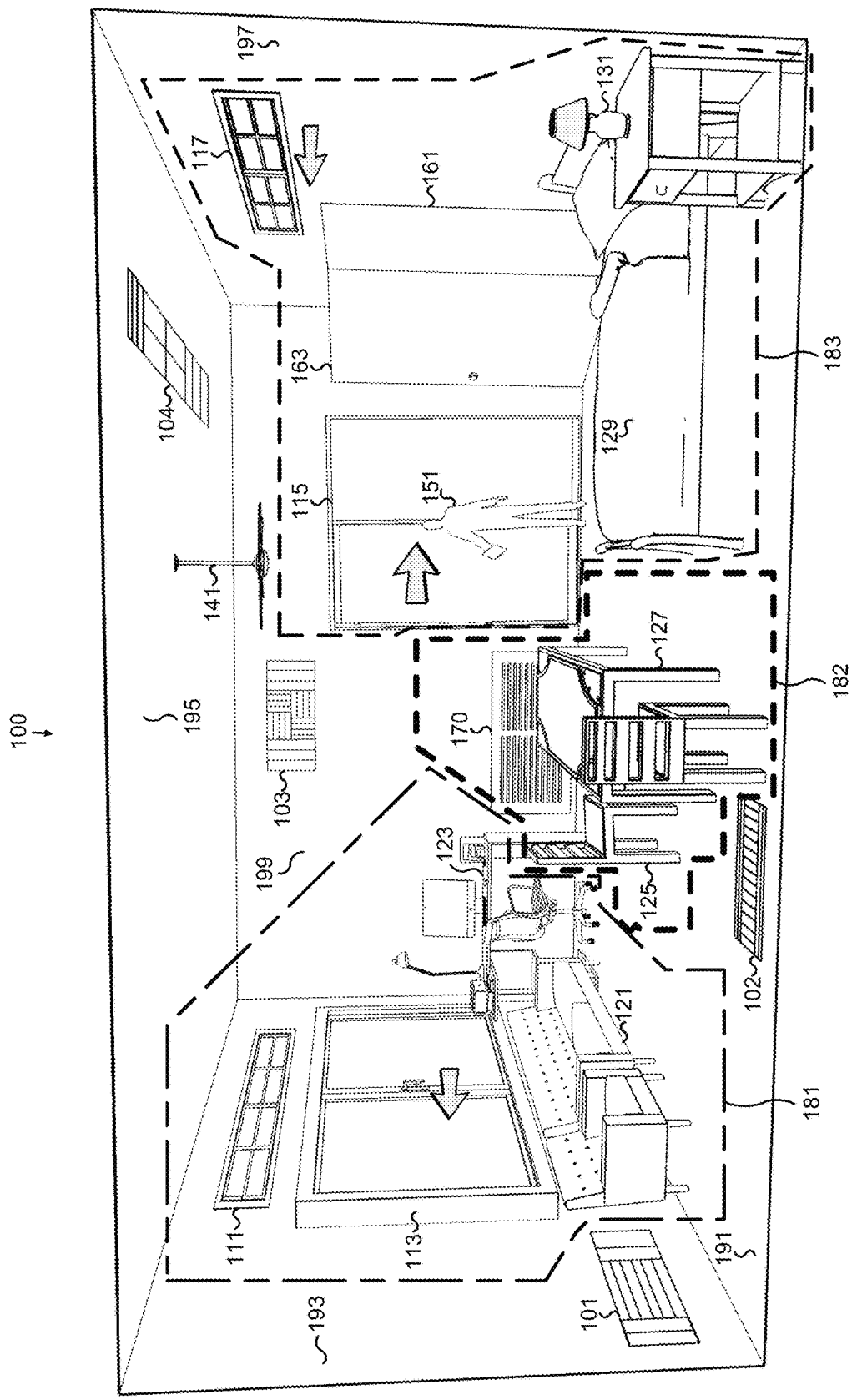
FIG. 1 illustrates an exemplary embodiment of a Smart Register Vent (SRV) device being implemented within a space of a structure.

Embodiments of the present disclosure and their advantages are best understood by referring to the detailed description that follows. It should be appreciated that like-reference-numerals are used to identify like-elements illustrated in one or more of the figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Various features of the present disclosure will now be described, and is not intended to be limited to the embodiments shown herein. Modifications to these features and embodiments will be readily apparent to those skilled in the art, and the principles defined herein may be applied to other embodiments without departing from the scope of the disclosure.

The SRV may be a self-learning device and hub operating to properly direct airflow in a space based on environmental features (e.g. room size, furniture location) and conditions (e.g. temperature) in a structure having one or more spaces. To properly direct airflow and determine environmental features and conditions within one or more spaces, the SRV may be in communication with one or more sensor modules. The one or more sensor modules may be positioned remotely from the SRV, positioned locally within the SRV, or both. The sensor modules may communicate to one or a plurality of SRVs. The sensor module may be in the same space or structure as the SRV, the sensor module may consist of a group of sensors or sensor modules spread throughout the space or structure. Each sensor module detects and communicates environmental features and conditions within a space or room in the structure to the SRV.

[Room Contents]

Referring to FIG. 1, as an exemplary embodiment of a plurality of Smart Register Vents (SRVs) 101, 102, 103, and 104 implemented within a space 100. Space 100 is subdivided into separate work, dining, and living spaces shown as subspace 181, subspace 182, and subspace 183. Space 100 may be occupied by individual(s) 151 and furnished with, for example, a sofa 121, an office desk 123, chairs 125, table 127, bed 129, and lamp 131. Space 100 may also be unfurnished and include only fixed and moveable features such as windows 111, 113, 117, exterior door 115, interior door 163, and ceiling fan 141. Moreover, space 100 may, for example, consist of stationary features such as doorway 161, air return 170, and SRVs 101-104. In the present disclosure, a space may refer to any unfurnished, furnished, or partly furnished space 100 that may or may not be occupied by individuals 151.

[Louver Positioning]

As shown in FIGS. 1 and 2A-2C, the louvers 203 and 205 of SRVs 101-104 are electronically adjustable and fitted to SRVs 101-104 in various quantities, sizes, and configurations to optimize the direction of airflow in a space 100. The louvers 203 and 205 of SRVs 101-104 may include horizontal louvers 203 and vertical louvers 205. The horizontal louvers 203 may pivot together along the same plane. Similarly, the vertical louvers 205 may pivot together along the same plane. The horizontal louvers 203 and the vertical louvers 205 may be coplanar and may pivot on axes coplanar with one another on SRVs 101-104. As one exemplary embodiment, SRV 101 includes horizontal louvers 203 longer, thinner, and greater in number than vertical louvers 205. As another exemplary embodiment, SRV 102 includes horizontal louvers 203 shorter, thicker, and greater in number than vertical louvers 205. As another exemplary embodiment, SRV 103 includes horizontal louvers 203 that include tiles of smaller horizontal and smaller vertical louvers positioned between vertical louvers 205. As another exemplary embodiment, SRV 104 includes vertical louvers 205 longer, thinner, and of greater quantity than the horizontal louvers 203.

[Louver Adjusting—Linking Element and Motor not Shown or Described]

Figure 2A:
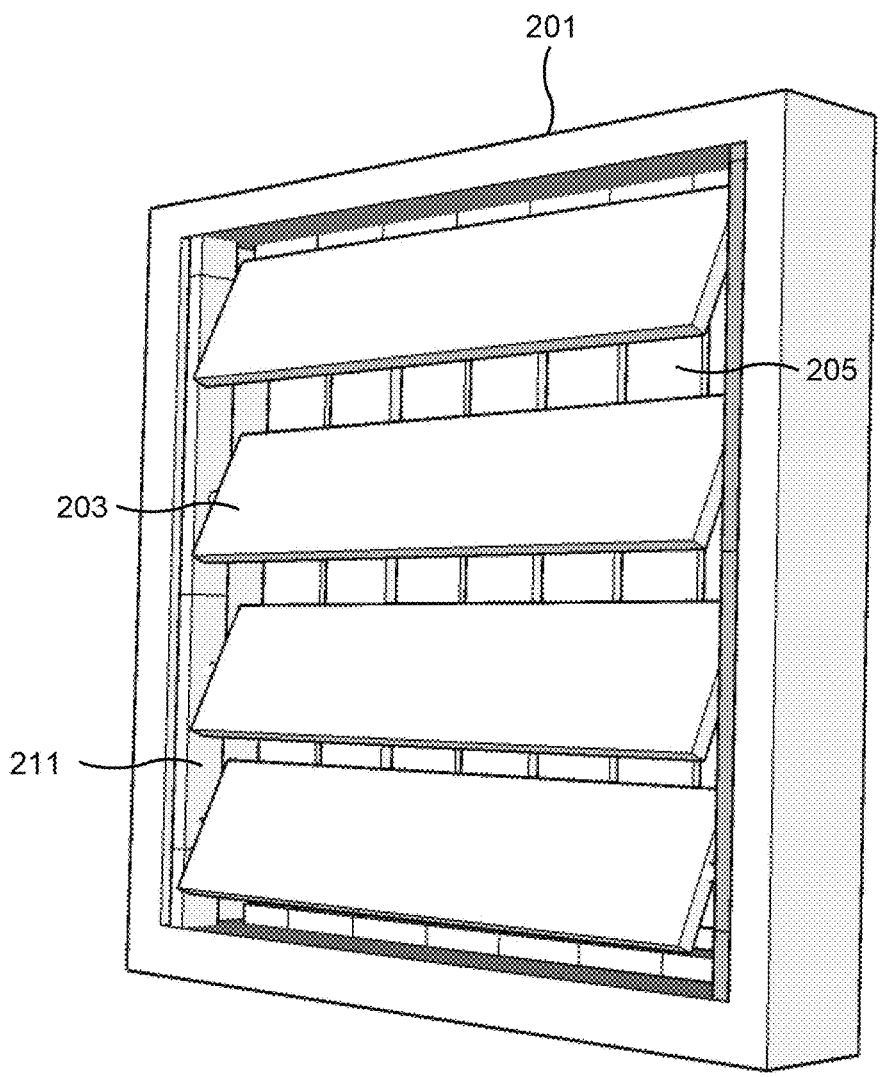
FIGS. 2A-2C illustrate an exemplary embodiment of the SRV device of FIG. 1.
Figure 2B:
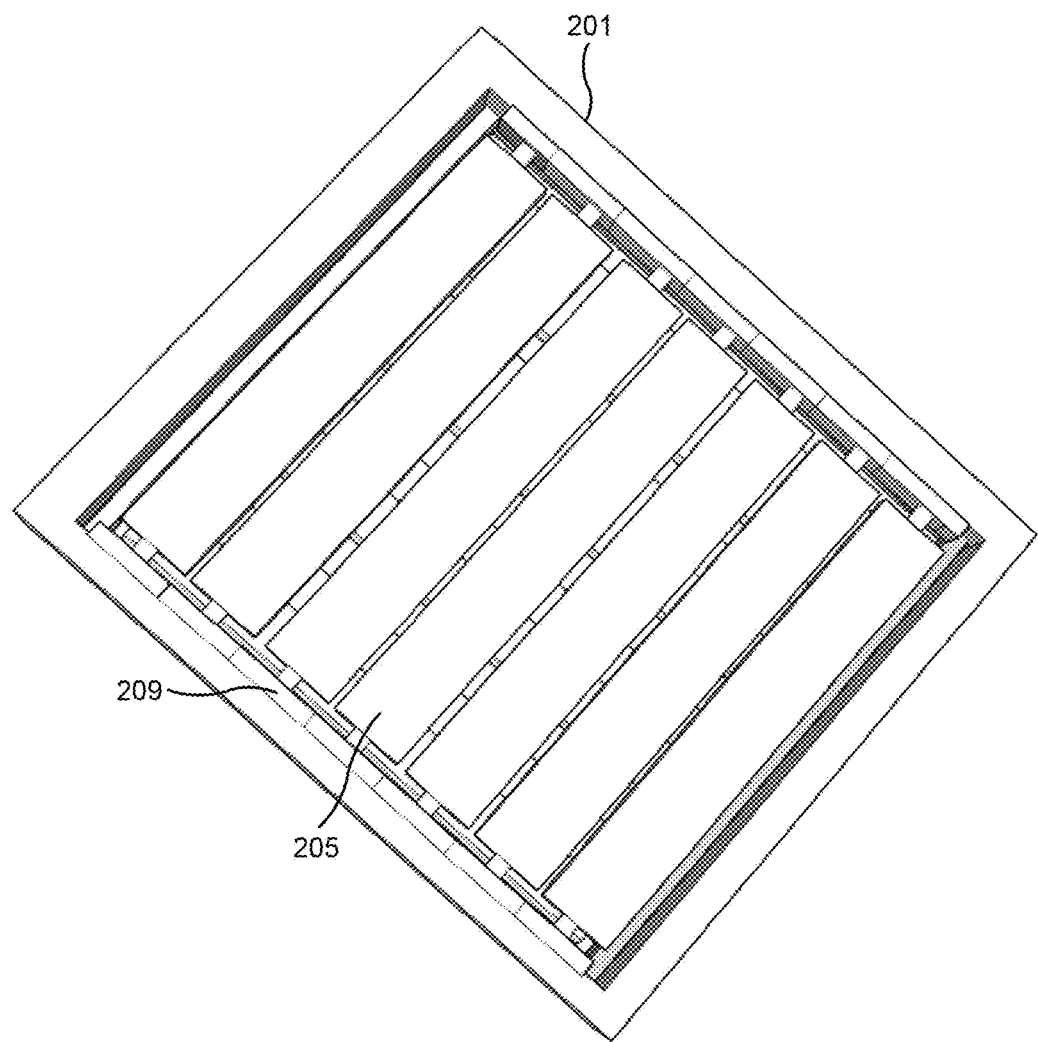
Figure 2C:
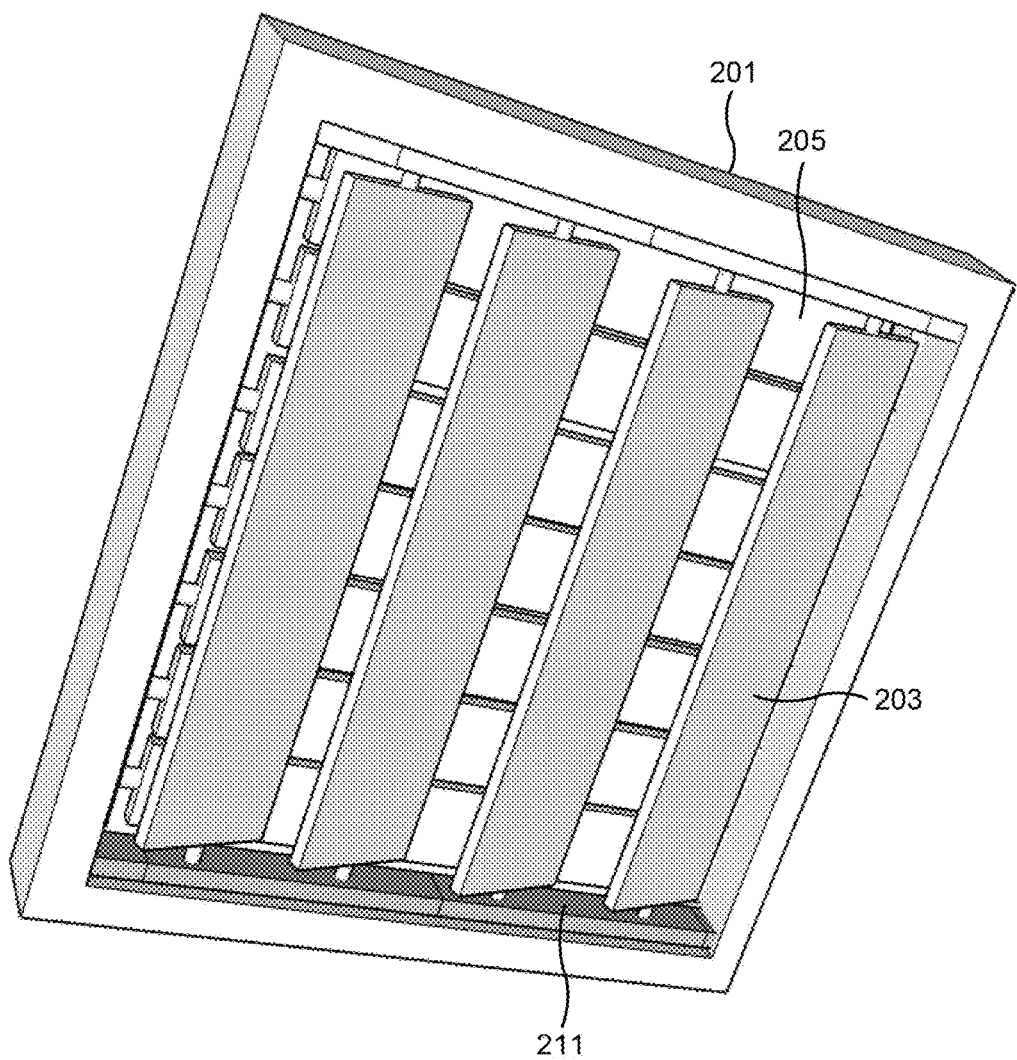

As discussed above, SRVs 101-104 include electronically adjustable louvers 203 and 205 arranged in various quantities, sizes, and configurations to optimize the direction of airflow and to bias airflow based on SRV 101-104 installation location in space 100 (e.g. ceiling, wall, or floor register installations). To further aid SRVs 101-104 in directing air into space 100, the louvers 203 and 205 may electronically open and close individually, as pairs, or all together to direct air from the ducting into the space 100. As shown in FIGS. 2A-2C, in some embodiments, the electronically adjustable louvers 203 and 205 of SRV 201 may be paired to open and close through a linking element 211 connected to a motor (not shown) (FIG. 2A). Alternatively, in other embodiments, the electronically adjustable louvers 203 and 205 of SRV 201 may each be individually connected to a linking element 209 and to a motor (FIG. 2B). Still yet, in some embodiments, the electronically adjustable louvers 203 and 205 of SRV 201 may be formed by stacking the vertical louvers 205 over the horizontal louvers 203, and each top and bottom pair of louvers 203 and louvers 205 or top pair (203, 203) and bottom pair (205, 205) may be controlled through one linking element 211 and one motor (FIG. 2C).

[Sensors Module Connection and Processor]

Referring again to FIG. 2, as an exemplary embodiment of SRV 201 of the present disclosure. SRV 201 may be communicably coupled to one or more sensor modules 350 (shown in FIG. 3). Sensor module 350 may be formed on SRV 201 or detachably coupled to SRV 201. Sensor module 350 may be remotely coupled to SRV 201 through network module 311 of SRV 201. Sensor modules 350 are communicably coupled to SRV 201 to transmit collected environmental features and conditions of space 100 to processor 302 of SRV 201 for processing. Processor 302 adjusts louvers 203 and 205 of SRV 201 to direct and control the amount of airflow in space 100 based on collected environmental features and conditions from sensor modules 350.

[Sensor Module, Information Collection]

Figure 3:
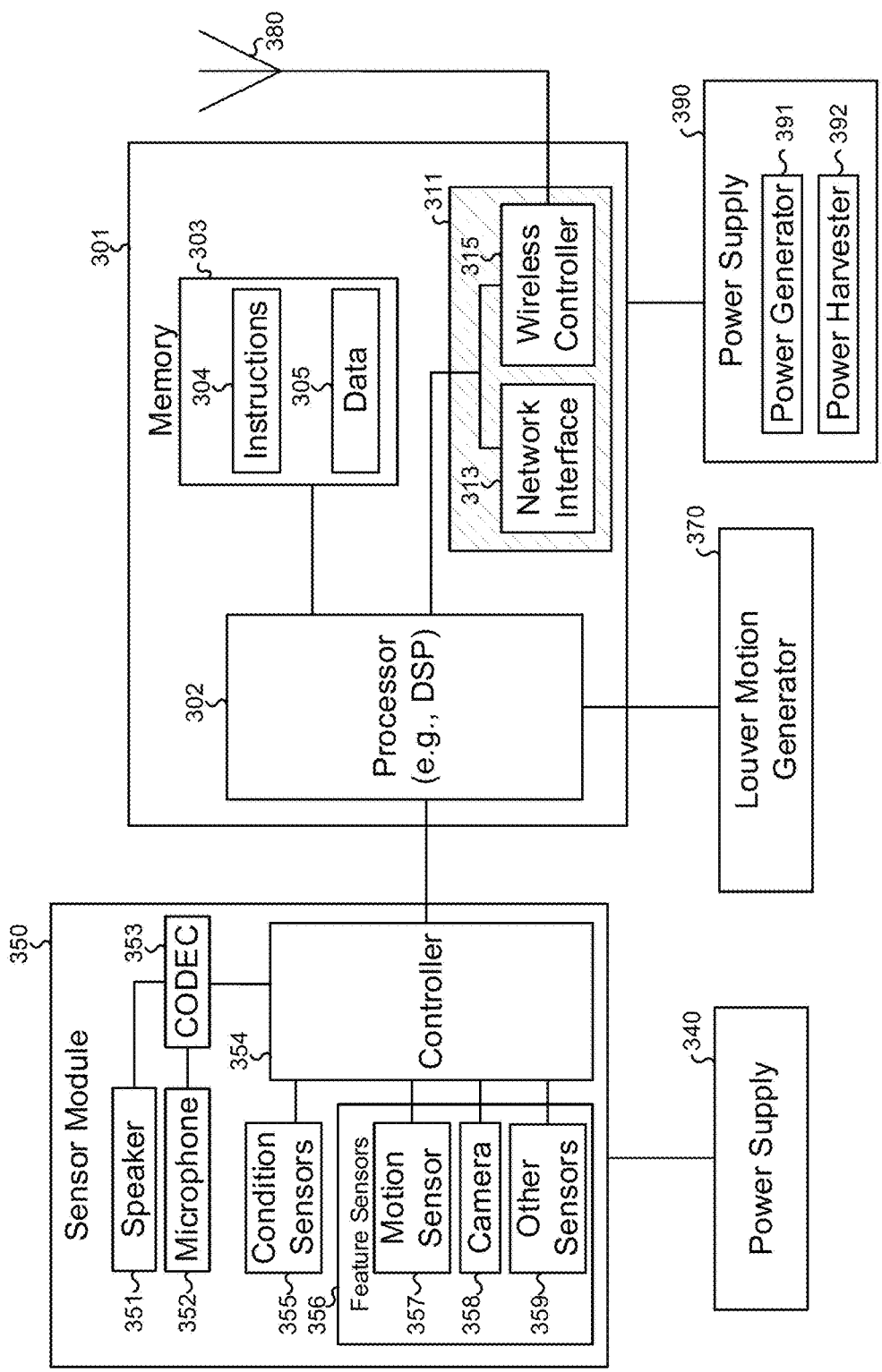
FIG. 3 illustrates an exemplary embodiment of the internal components of the SRV device of FIG. 1.

Referring to FIGS. 1-3, sensor module 350 of SRV 101-104 may be configured to detect environmental features of a surrounding environment such as at least one of an individual information and at least one of a space information. One or more sensor modules 350 may be positioned in space 100 and communicably coupled to SRVs 101-104. Sensor modules 350 may be formed on each SRV 101-104, detachably coupled to each SRV 101-104, or remotely coupled to each SRV 101-104 through network module 311.

Individual information of individual 151 may include at least one of the following: height, build, temperature, complexion, proximity to SRV 101-104, and occupancy or the number of individuals 151 in the space 100. Space information of space 100 may include at least one of the following: objects in space 100 obstructing the flow of air from an HVAC duct to a desired area or individual 151, SRV 101-104 installation location, windows 111, 113, 117, doors 115, and openings and cavities (e.g. air return 170, and doorway 161). Collected space and individual information is sent to processor 302, server 411, and/or transmitter 431 (shown in FIG. 5). Processor 302, server 411, and/or transmitter 431 respond by directing SRVs 101-104 to adjust louvers 203 and 205 appropriately to direct airflow into the subspaces 181, 182, and 183 of space 100 based on collected environmental features and user preferences.

Similarly, sensor module 350 of SRV 101-104 may be configured to detect environmental conditions such as at least one of the following: temperature, humidity, smoke, CO, $CO_2$ in space 100. Collected environmental conditions are sent to processor 302, server 411, and/or transmitter 431. Processor 302, server 411, and/or transmitter 431 respond by directing SRVs 101-104 to adjust louvers 203 and 205 appropriately to direct airflow into the subspaces 181, 182, and 183 of space 100 based on collected environmental conditions and user preferences.

Sensor modules 350 may be configured to transmit detected environmental features and conditions to SRVs 101-104. The processor 302 of each SRV 101-104 may adjust each of the louvers 203 and 205 based on detected environmental features and conditions. Each SRV 101-104 may also transmit collected environmental features and conditions to server 411 and/or transmitter 431 for determining how to adjust louvers 203 and 205. Sensor modules 350 may further be communicably coupled to server 411 and/or transmitter 431 to allow either server 411 and/or transmitter 431 to control each of the louvers 203 and 205 of each SRV 101-104. As shown in FIG. 5, server 411, transmitter 431, and each SRV 101-104 may be communicably coupled to a thermostat 441. The thermostat 441 may receive instruction from any one of the SRVs 101-104, the server 411, and the transmitter 431 to initiate the HVAC system to heat, cool, or fan the space 100.

[Description of Spaces, Thermostat, HVAC]

Referring to FIG. 1, subspace 181 may include, for example, a sofa 121, an office desk 123, and windows 111 and 113. Heating, cooling, and ventilation of subspace 181 may be facilitated by electronically adjustable louvers 203 and 205 of SRVs 101 and 103.

In subspace 181, the location of SRV 101 and SRV 103 may prevent immediate and adequate heating or cooling of subspaces 181, 182, and 183 within space 100. For example, in subspace 181, adjacent sidewall 193, sofa 121, and floor 191 block airflow from SRV 101 into subspace 181. Similarly, airflow directly out of SRV 103 will move closer towards the ceiling 195 and not towards subspace 181. Thus, proper adjustment of registers SRV 101 and 103 in subspace 181 allows for effective heating, cooling, and ventilation.

[Scenario 1: Recirculate Air in Room, Subspace 181]

In one embodiment, the user or individual 151 may desire to recirculate air in subspace 181 by having thermostat 441 turn on the HVAC fan when sensor modules 350 detect window 113 to be open. Sensor modules 350 may detect individual 151 opening window 113 in subspace 181, the opening of window 113 is communicated to processor 302 of SRV 101 and SRV 103, the louvers 203 and 205 of SRV 101 and 103 may be adjusted to direct airflow towards the window 113 to recirculate air in the space 100. To recirculate air in subspace 181, the louvers 203 and 205 of SRV 101 and SRV 103 are adjusted based on collected environmental features from sensor module 350.

SRV 101 may include, for example, one set of horizontal louvers 203 and a pair of vertical louvers 205 at each of the two vertical ends of the SRV 101. To recirculate air in subspace 181, horizontal louvers 203 of SRV 101 are adjusted to direct air away from the floor 191 and towards the ceiling 195, the vertical louvers 205 of SRV 101 may be closed so that airflow is not directed towards the sidewalls 193 or sofa 121. The horizontal louvers 203 of SRV 103 may include, for example, four smaller louvers spanning the horizontal section of SRV 103. The four smaller louvers include two smaller vertical louvers and two smaller horizontal louvers. The two smaller vertical louvers of the horizontal louvers 203 of SRV 103 are adjusted to direct air towards window 113 and away from ceiling 195, and the two smaller horizontal louvers of horizontal louvers 203 are closed to prevent airflow from going towards the ceiling 195 or subspace 182. The vertical louvers 205 are adjusted to direct airflow towards window 113 and away from subspaces 182 and 183. However, the user or individual 151 may decide, based on the layout of the space 100 and subspaces 181 and 182, to have the two smaller horizontal louvers of the horizontal louvers 203 opened or partially opened to circulate air around subspace 181.

[Scenario 2A: Heat/Cool Office Desk Area 123, Subspace 181]

In another embodiment, the user or individual 151 may desire to direct hot or cold air in subspace 181 towards a common living area such as sofa 121 or a work area such as office desk 123. Sensor modules 350 may detect an individual 151 at office desk 123 or an individual 151 sitting on sofa 121. Upon detecting the air conditioner or heater to be on, the sensor module 350 communicates to processor 302 of SRV 101 and SRV 103 to adjust the louvers 203 and 205 of SRV 101 and 103 to direct airflow towards the sofa 121 or the office desk 123. Sensor modules 350 aid SRV 101 and 103 to compensate for vent location and environmental features within subspace 181.

In subspace 181, it may be ineffective to open SRV 101 to heat or cool an area near office desk 123 as the direction of most of the airflow will be limited by the floor 191 or the sofa 121, or pushed into subspace 182. Sensor modules 350 may detect environmental features of space 100 and subspace 181, and instruct one or more air registers (e.g. SRV 101) to close to prevent excessive and wasteful usage of heating and cooling in space 100. SRV 103 may be opened to heat or cool an area near office desk 123 while SRV 101 may be closed. The two smaller vertical louvers of the horizontal louvers 203 of SRV 103 are adjusted to direct air towards office desk 123, the two smaller horizontal louvers of horizontal louvers 203 are directed towards the floor 191, the vertical louver 205 closest to the office desk 123 is open, and the other vertical louver 205 is closed to prevent airflow from going towards the ceiling 195 or subspace 182. Again, the user or individual 151 may decide, based on the layout of the space 100 and subspaces 181 and 182, on which louvers 203 and 205 to open, partially open, or close to heat or cool an area near office desk 123 in subspace 181.

[Scenario 2B: Heat/Cool Sofa Area 121, Subspace 181]

Similarly, a combination of adjusting louvers 203 and 205 of SRV 101 and SRV 103 may be used to heat or cool an area near sofa 121. Vertical louvers 205 of SRV 101 may be opened and adjusted to direct airflow towards the sofa 121, while horizontal louvers 203 may be closed or partially closed to limit airflow into subspace 182 and away from the sofa 121. The left vertical louvers 205 of SRV 103 closest to the sofa 121 may be opened, and the lower smaller horizontal louver and the lower smaller vertical louver of louvers 203 of SRV 103 may be opened to direct airflow towards sofa 121.

[Scenario 3: Partially/Fully Obstructed, Avoid Heat/Cool/Fan Table/Chair/Individual, subspace 182]

Referring to FIG. 1, subspace 182 may include, for example, a dining table 127, dining chairs 125, and air return 170. Heating, cooling, and air recirculation of subspace 182 may be facilitated by electronically adjustable louvers 203 and 205 of SRV 102. The air return 170 transfers air from subspace 182 back to the HVAC system to recirculate through the HVAC ducting system.

In one embodiment, the user or individual 151 may desire to heat, cool, or recirculate air in subspace 182 by having thermostat 441 turn off the HVAC heating, cooling, or fan when sensor modules 350 detect the SRV 102 being obstructed by an object. Sensor modules 350 may communicate environmental features and conditions to SRV 102. SRV 102 may then determine to redirect airflow around obstacles, or minimally open or close itself when obstructed and direct other registers (e.g. SRV 103) to open to direct airflow in subspace 182. SRV 102 may also instruct thermostat 441 to turn off the HVAC system to avoid wasting energy.

The location of SRV 102 on floor 191 limits immediate and adequate heating or cooling of subspace 182. Airflow from SRV 102 into subspace 182 may blocked by table 127 and chairs 125. Sensor modules 350 may compensate for these environmental features to allow SRV 102 to effectively heat, cool, or recirculate air in subspace 182. Thus, proper adjustment of louvers 203 and 205 of SRV 102 in subspace 182 allows for effective heating, cooling, and ventilation.

Sensor modules 350 may detect an object, for example, chairs 125 or table 127 obstructing airflow into subspace 182. Sensor modules 350 may communicate to SRV 102 that chair 125 is partially obstructing airflow from SRV 102, or table 127 is partially or fully blocking airflow into subspace 182. If possible, SRV 102 may either adjust louvers 203 and 205 to direct airflow around obstructions (e.g. table 127), or close SRV 102 and open SRV 103 positioned closest to subspace 182. SRV 102 or SRV 103 may instruct thermostat 441 to turn on HVAC to push air in subspace 182 and go around or avoid obstructions such as table 127 and chair 125.

In subspace 182, the user of individual 151 may wish to direct airflow from horizontal louvers 203 of SRV 102 upwards directly towards ceiling 195, while vertical louvers 205 of SRV 102 may be directed away from the walls and towards the air return 170. The horizontal louvers 203 of SRV 102 may also be periodically adjusted to direct airflow at angles within the room. The arrangement of furniture detected by sensor modules 350 will aid SRV 102 in directing airflow for heating, cooling, or recirculating air in subspace 182. Sensor modules 350 may communicate to SRV 102 when individual 151 is sitting on chair 125 or sitting at table 127 and positioned very close to SRV 102. SRV 102 may respond by adjusting louvers 203 and 205 to direct airflow away from the individual, or adjusting louvers 203 and 205 to reduce the amount of air blowing on them. Thus, SRV 102 may direct thermostat 441 to heat or cool subspace 182 while making necessary adjustments to avoid making individuals 151 or occupants of subspace 182 uncomfortable.

[Scenario 4: Sweep Air, Prevent AC/Heat Door/Doorway, Adjust Heat/Cool Bed Use Proximity]

Referring to FIG. 1, subspace 183 may include, for example, a door 115, a bed 129, lamp 131, window 117, and doorway 161 and door 163. Heating, cooling, and ventilation of subspace 183 may be facilitated by electronically adjustable louvers 203 and 205 of SRV 104.

In subspace 183, by using environmental features and conditions transmitted from sensor modules 350, the SRV 104 may decide how to effectively recirculate air in subspace 183 using the location of an open window 117 or door 115. Further, the location of the SRV 104 near an open door 161 or open doorway 163 may cause cold or hot air to seep out of space 100 thereby preventing adequate heating or cooling of subspace 183 within space 100. Thus, proper adjustment of register SRV 104 in subspace 183 allows for effective heating, cooling, and ventilation.

[Scenario 4A: Sweep Air/Recirculate Air]

In one embodiment, SRV 104 may recirculate air in subspace 183 by either directing airflow outside of space 100 through window 117 or door 115 or oscillating louvers 203 and 205 from open to closed positions to sweep air across an area of space 100. SRV 104 includes two vertical louvers 205 and four horizontal louvers 203. Each vertical louver 205 is located at one of the two ends of the SRV 104 for directing air across subspace 183 from door 115 to lamp 131. Two upper and two lower horizontal louvers 203 are located between the two vertical louvers 205 for directing air across subspace 183 from sidewall 197 to sidewall 193. Therefore, vertical louvers 205 of SRV 104 traverse space 100 in a width-wise direction across subspace 183, and horizontal louvers 203 of SRV 104 traverse space 100 in a length-wise direction across subspaces 181-183.

Sensor modules 350 may detect an open window 117 or door 115, or may detect individual 151 opening window 117 or door 115. Sensor modules 350 communicate to SRV 104 the window 117 or door 115 being opened or already open. SRV 104 may instruct thermostat 441 to turn on the HVAC fan to push air in subspace 183 out of open door 115 or window 117. SRV 104 may also instruct the thermostat 441 to operate the HVAC fan for only space 100 in a structure or only subspace 183 in space 100, thereby limiting excessive or unnecessary usage of the HVAC system. Moreover, thermostat 441 and SRV 104 may cooperate to improve zoning of a building or structure. SRV 104 may instruct other SRVs 101-103 to close in other rooms or subspaces 181-182, to improve efficiency of airflow in a space 100 and to save energy costs.

In subspace 183, when door 115 is open, sensor modules 350 may communicate environmental features and conditions to the processor 302 of SRV 104 to adjust louvers 203 and 205 to direct airflow towards open door 115. SRV 104 may respond by opening horizontal louvers 203 to direct airflow towards the left side (or open side) of door 115 and towards subspace 182. The first pair of vertical louvers 205 of SRV 104 closest to the bed 129 may push air across the bed 129, while the second pair of vertical louvers 205 of SRV 104 may direct airflow towards the left side of door 115. The pair of vertical louvers 205 of SRV 104 need not be static. The louvers 203 and 205 of SRV 104 can be adjusted incrementally with time or periodically to better direct airflow, to account for SRV 104 location, or to account other environmental features and conditions of subspace 183. For example, to recirculate air in subspace 183, the second pair of vertical louvers 205 of SRV 104 may initially direct airflow towards the floor 191 and then gradually swing towards the left side of door 115. Similarly, the horizontal louvers 203 may initially direct airflow towards sidewall 197 and then gradually swing towards sidewall 193 to move air towards the open door 115.

In subspace 183, when window 117 is open, sensor modules 350 may communicate environmental features and conditions to the processor 302 of SRV 104 to adjust louvers 203 and 205 to direct airflow towards open window 117. SRV 104 may respond by closing vertical louvers 205 and sweeping subspaces 181-183 by oscillating louvers 205 from left to right (e.g. from an open position, to partially closed position and pointing towards subspace 181, back to an open position, then to partially closed position and pointing towards subspace 183). SRV 104 may then point louvers 205 towards window 117 to push air out through window 117 and out of space 100. The horizontal louvers 203 of SRV 104 may begin by initially directing air towards sidewall 193 then moving along the floor 191 through subspaces 181, 182, and 183. The horizontal louvers 203 of SRV 104 may complete the motion by directing air out of window 117. The horizontal louvers 203 may sweep or oscillate through a smaller angle to cover fewer areas (e.g. sweeping between the boundaries of only subspace 183). Alternatively, the horizontal louvers 203 of SRV 104 may be adjusted to move air directly out of subspace 183 and through window 117.

Thus, collected environmental features and conditions by sensor modules 350 may determine whether door 115 or window 117 is open in subspace 183. Sensor modules 350 may transmit collected environmental features and conditions (e.g. opening of door 115) to SRV 104. SRV 104 may recirculate air in subspace 183, by directing airflow towards an open window 117 or door 115, or by sweeping (or oscillating) the space 100. To sweep air across subspace 183, the sensor modules 350 may determine how to adjust the louvers 203 and 205 of SRV 104 based on the location of SRV 104, size and layout of the space 100, and the location of furniture and fixtures.

[Scenario 4B: Prevent AC/Heat Out Door/Doorway, Adjust Heat/Cool Bed Using Proximity]

In another embodiment, SRV 104 may direct HVAC cooling, beating, or fan to an individual 151 sleeping on bed 129. The location of SRV 104 near an open door 161 or open doorway 163 may cause cold or hot air to seep out of subspace 183 thereby preventing adequate heating or cooling of an individual 151 sleeping on bed 129.

Sensor modules 350 may detect an individual 151 sitting or sleeping on bed 129, and SRV 104 location on ceiling 195. Sensor modules 350 communicate environmental conditions and features to SRV 104. SRV 104 determines the direction for adjusting louvers 203 and 205 to guide airflow for HVAC cooling, heating, or fanning of individual 151 on bed 129. SRV 104 may adjust louvers 203 and 205 to prevent directing airflow towards sidewalls 193, 197, and 199, or floor 191. To limit excessive or unnecessary usage of HVAC system, SRV 104 may also instruct thermostat 441 to operate HVAC system for only space 100 or only subspace 183 in space 100. Moreover, thermostat 441 and SRV 104 may cooperate to improve zoning of a building or structure. SRV 104 may instruct other SRVs 101-103 to close in other rooms or subspaces 181-182, to improve efficiency of airflow in a space 100 and to save energy costs.

The louvers 203 and 205 of SRV 104 may be adjusted to reduce airflow, increase airflow, or stop airflow to account for environmental features, conditions, and individual 151 preferences. Sensor modules 350 may distinguish individuals 151 to be toddlers, infants, elderly, or individuals with high body heat or low body heat that may be sensitive to catching a cold from the force of air from SRV 104. When certain individuals 151 are detected in subspace 183 or too close to SRV 104, the processor 302 of SRV 104 adjusts louvers 203 and 205 accordingly to reduce the force of air directed towards individuals 151 in the space 100. SRV 104 may optimize direction of air delivery to bed 129 by using SRV 104 location information (e.g. ceiling, wall, or floor installation), as well as individual 151 and bed 129 location.

The processor 302 of each SRV 101-104 may process an algorithm to trace and isolate environmental features in the space 100 to create outlines of windows 117, doors 163, individuals 151, etc. For example, features in the space 100 may include the size, type, number, and locations of windows, doors, closets, entry door, and register/vent location (e.g. floor, ceiling, or wall). The SRV 101-104 sensors (e.g.

camera and microphone) aide the processor 302 determining how to adjust the louvers 203 and 205 of SRVs 101-104 when a condition in space 100 has changed (e.g. window 113 or door 115 opened, or bed 129 location changed).

The processor 302 of each SRV 101-104 adjusts louvers 203 and 205 to direct controlled airflow around such obstructions (e.g. table 127, sofa 121, etc.) and towards individuals 151 or defined locations in a space 100 (e.g. towards bed 129 or work desk 123), building, or room. The processor 302 of each SRV 101-104 may trace features in the space 100 or subspace 181-183 captured by the sensor module 350 to create outlines of these features within space 100. The outlines may be of furniture that at least partially blocks airflow, or outlines of walls that block airflow, or outlines of windows and doors that can be used to either recirculate air or may reduce the effectiveness of heating or cooling of a space 100. The processor 302 of each SRV 101-104 collects traces features from the sensor modules 350 to appropriately adjust the direction of airflow to optimize airflow in the room. As the user or individual 151 removes, alters, or relocates features in their living space to meet their needs, each SRV 101-104 may adjust to optimize delivery of air in the living space. The sensor modules 350 may be configured to collect information about the layout of a space and the location of objects and individuals within that space. The sensor modules 350 may be learning sensor modules and may be trained by the user or learn from user behavior. The SRVs 101-104 may also be learning registers and may be trained by the user or learn from user behavior. The sensor modules 350 of SRVs 101-104 may enable image recognition technology or voice recognition technology, and may provide the processor 302 of each SRV 101-104 with further instructions on moving the electronically adjustable louvers 203 and 205. The louvers 203 and 205 of SRVs 101-104 may be adjusted throughout the day based on collected environmental features and conditions, and based on typical activities of the user or individual 151.

The one or more louvers 203 and 205 of SRVs 101-104 may be position in any direction as shown in FIG. 1. The one or more louvers 203 and 205 may be position along one of a vertical direction, a horizontal direction, or an angled direction. The SRVs 101-104 may store collected information from the sensor modules 350, thermostat 441, remote computing devices 431, and server 411 in a database. The database may be stored on the storage 402 of the SRV device 401, memory 303, on the storage 412 of a server 411, or on an application on a remote computing device 431. The space and individual information in the database is updated with the individual and space information acquired by the one or more sensors of a surrounding environment. A user or individual 151 may be prompted to update or approve updating of the database with additional space and individual information acquired by the one or more sensors. The user or individual 151 may further store user preferences in the database, the user preferences with specific instructions or actions based on collected space or individual information, scheduling, time of day, temperature, humidity, etc. The space and individual information acquired by the one or more sensors is compared with user preferences stored in the database, the database may then be used by the SRVs 101-104 to determine whether to open, close, partially open or close the one or more louvers of the SRV device to appropriately guide airflow based on user preferences and stored information within the database.

Referring again to FIG. 1, the ceiling fan 141 may be determined by sensor modules 350 to be moving (on state), or not moving (off state). The processor 302, server 411, and/or remote computing device 431 (e.g. user or individual 151 defined) may instruct SRV device 104 to close when ceiling fan 141 is in the on state. The processor of SRV device 104 may also be configured to wirelessly or remotely operate ceiling fan 141 to circulate air in a subspace 183 or space 100.

Referring to FIGS. 1-4 and FIG. 6, louvers 203 and 205 of the Smart Register Vents (SRVs) of the present disclosure may be of any material, size, orientation, or shape. The material of the louvers 203 and 205 and SRVs 101-104 may be plastic, metal, engineered wood, laminate, or any type of rigid material or rigid material composite or alloy. As shown in FIG. 1, louvers 203 and 205 of SRVs 101-104 may be coplanar to each other or formed on separate planes spaced from each other (shown in FIGS. 2A-2C). The louvers 203 and 205 of SRVs 101-104 may open, close, partially open, or partially close by a louver motion generator 370. The louver motion generator 370 acts to adjust the angle of each of the one or more louvers 203 and 205 from about 0° to about 180° to guide airflow from the ducting of the HVAC system into space 100. In some embodiments, the louver motion generator 370 may be directly attached to one or more louvers 203 and 205 for guiding airflow. Alternatively, the louver motion generator 370 may be attached to a plurality of louvers 203 and 205 through a linking element 209 or 211. As shown in FIGS. 2B-2C, louvers 203 and 205 may be attached individually to a linking element 209 (e.g. gears, pulleys, or tracks) and driven to move, slide, or rotate by a motor or actuator (not shown), or grouped together and attached to a linking element 211 (e.g. belts, or chains) and driven to move, slide, or rotate by a motor or actuator (not shown), or any combination of linking elements 209 and 211.

Figure 6:
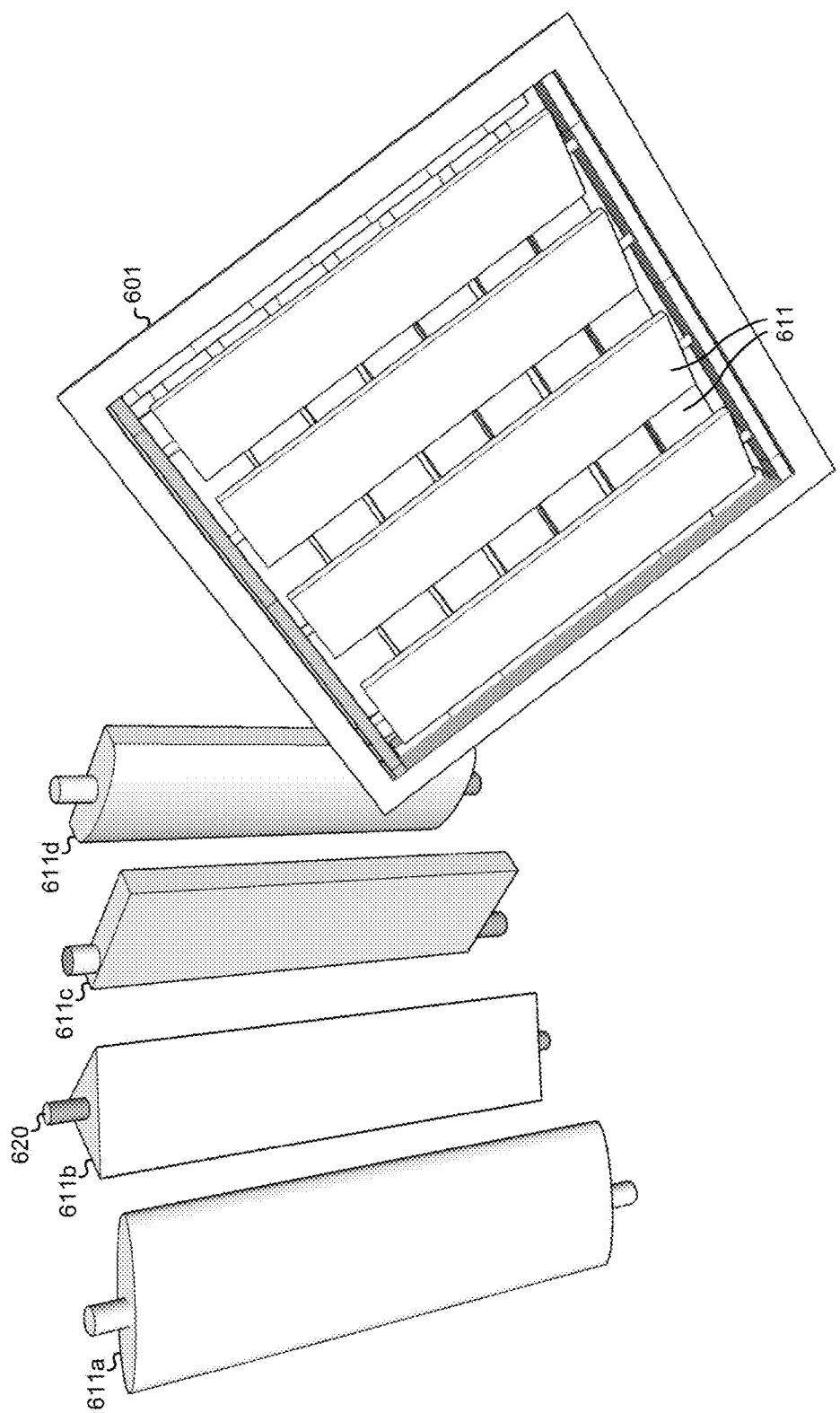
FIG. 6 illustrates exemplary embodiments of the louvers of the SRV of FIG. 1.

As shown in FIG. 6, for effectively guiding airflow in a space 100, the louver blades 611 of SRV 601 may take any shape, size, or form. The louver blades 611 may be a rectangular louver blade 611c, a triangular louver blade 611b, an elliptical louver blade 611a, or a composite of two shapes (e.g. semi-circular) composite louver blade 611d. The louver blade 611 may include one or more louvers bar 620 for adjusting the louver blade 611 from about 0° to about 180°. The louver bar 620 may couple to the linking element 209 or 211 or directly to the louver motion generator 370. The louver bars 620 may be formed at the center cross-section of the louver blade 611, as shown in elliptical louver blade 611a, at an end of the louver blade 611, as shown in rectangular louver blade 611c, or at an off-center cross-section of the louver blade 611, as shown in composite louver blade 611d. The individual 151 may adjust louver blades 611 manually or automatically through an algorithm stored on a remote computing device 431 to provide airflow within a space 100 based on a set program, schedule, or space 100 configurations.

Also, to allow the individual 151 to change the appearance of the register, SRVs 101-104, 201, and 601 may include a magnetically couplable faceplate for attaching register faceplates of various colors and designs. For example, SRVs 101-104 may further include a sensor cover for covering one or more sensor component (e.g. camera 358) of a sensor module 350 to provide for privacy. The controller 354 and/or the processor 302 may instruct the sensor cover to move to cover the one or more sensor component. Furthermore, SRVs 101-104 may comprise of a magnetic body, or magnetic plate attached to the body of SRVs 101-104 for easily be detached from a wall or ceiling for cleaning or repair. The body of SRVs 101-104 may include screw holes for attaching the register to a wall, ceiling, or floor.

[Smart Vent Register Internals]

FIG. 3 illustrates conceptually an exemplary SRV device 301 with which some exemplary embodiments of the present disclosure may be implemented. The SRV device 301 may be any sort of electronic device that transmits signals over a network, such as electronic devices embedded in smart appliances and other smart systems. The SRV device 301 may include various types of computer readable media (e.g., a non-transitory computer-readable medium) and interfaces for various other types of computer readable media.

Figure 4:
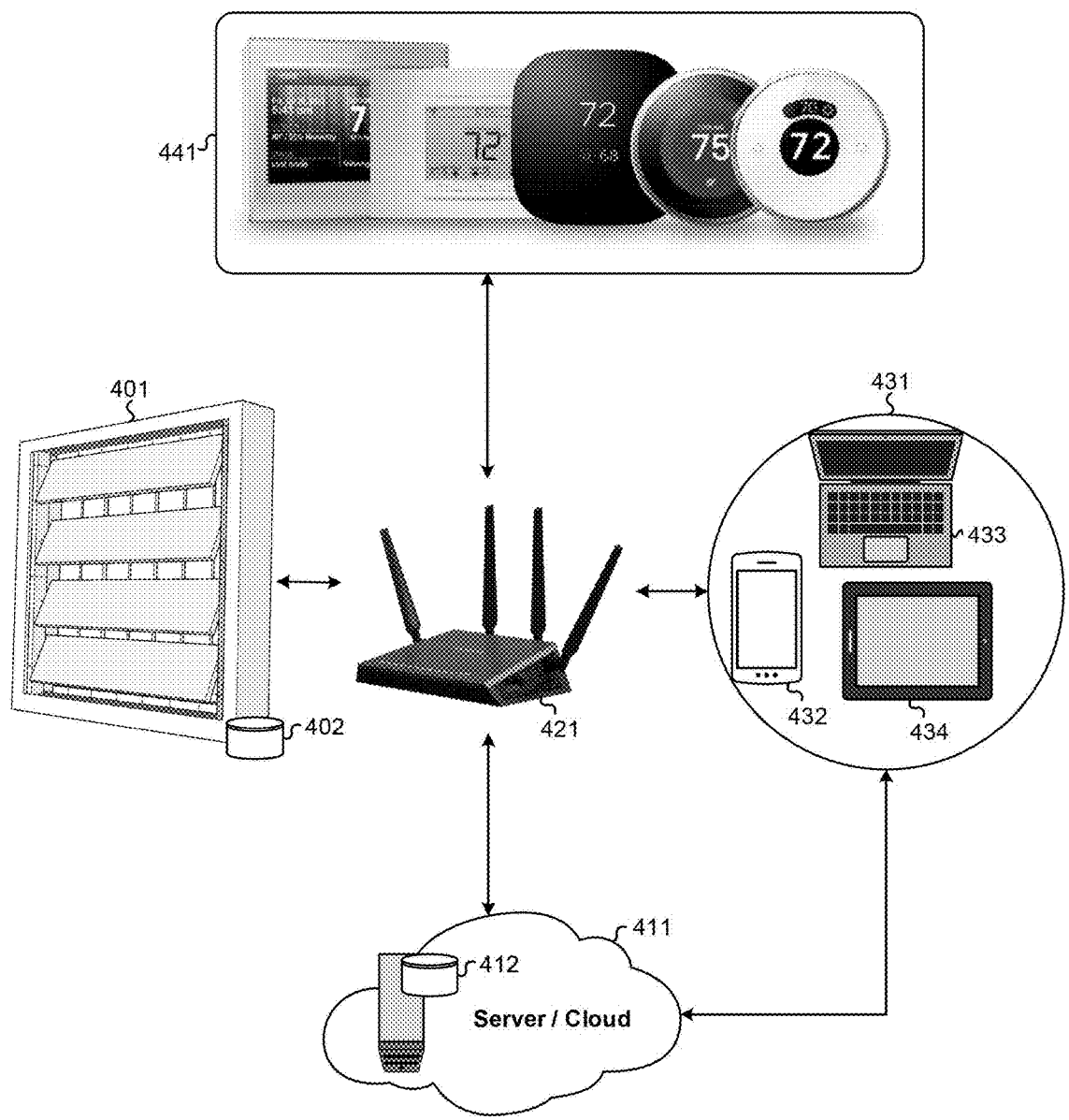
FIG. 4 illustrates an exemplary embodiment of the SRV device of FIG. 1 communicating with other smart devices or remote computing devices.
Figure 5A:
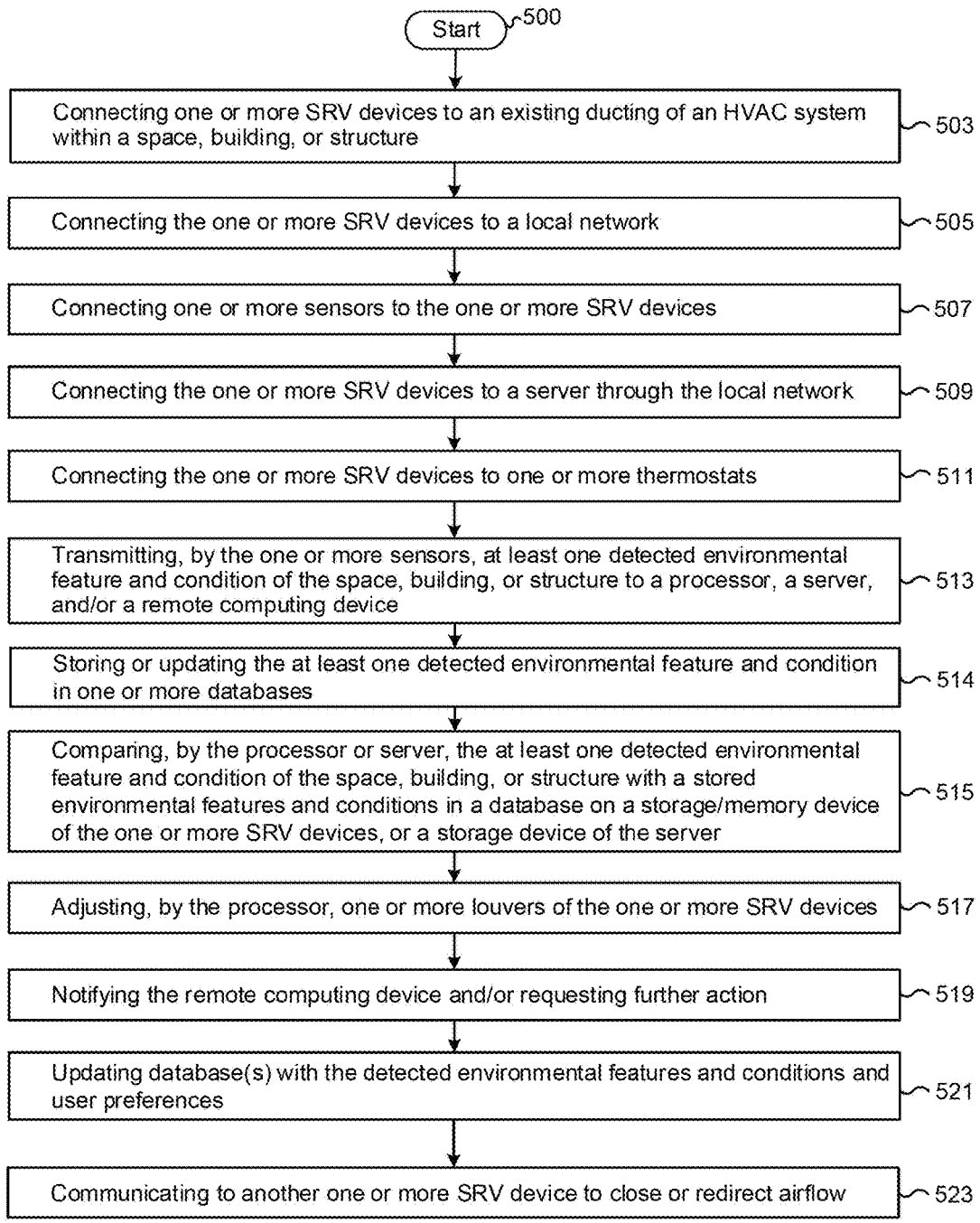
FIG. 5A illustrates an exemplary embodiment of a flowchart of interactions and operations of the SRV device of FIG. 1 based on one example of environmental features and conditions.
Figure 5B:
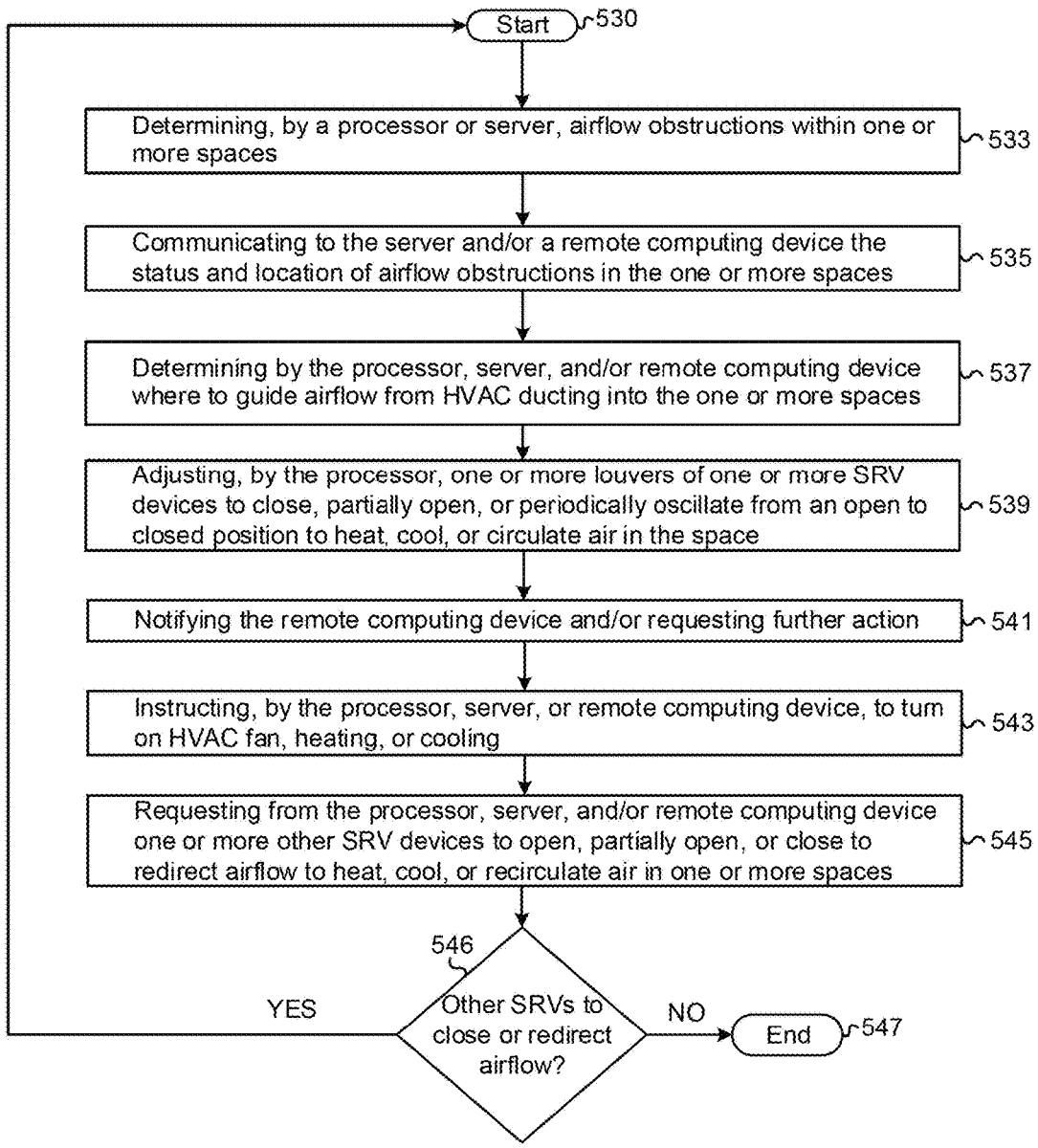
FIG. 5B illustrates an exemplary embodiment of a flowchart of interactions and operations of the SRV device of FIG. 1 based on another example of environmental features and conditions.
Figure 5C:
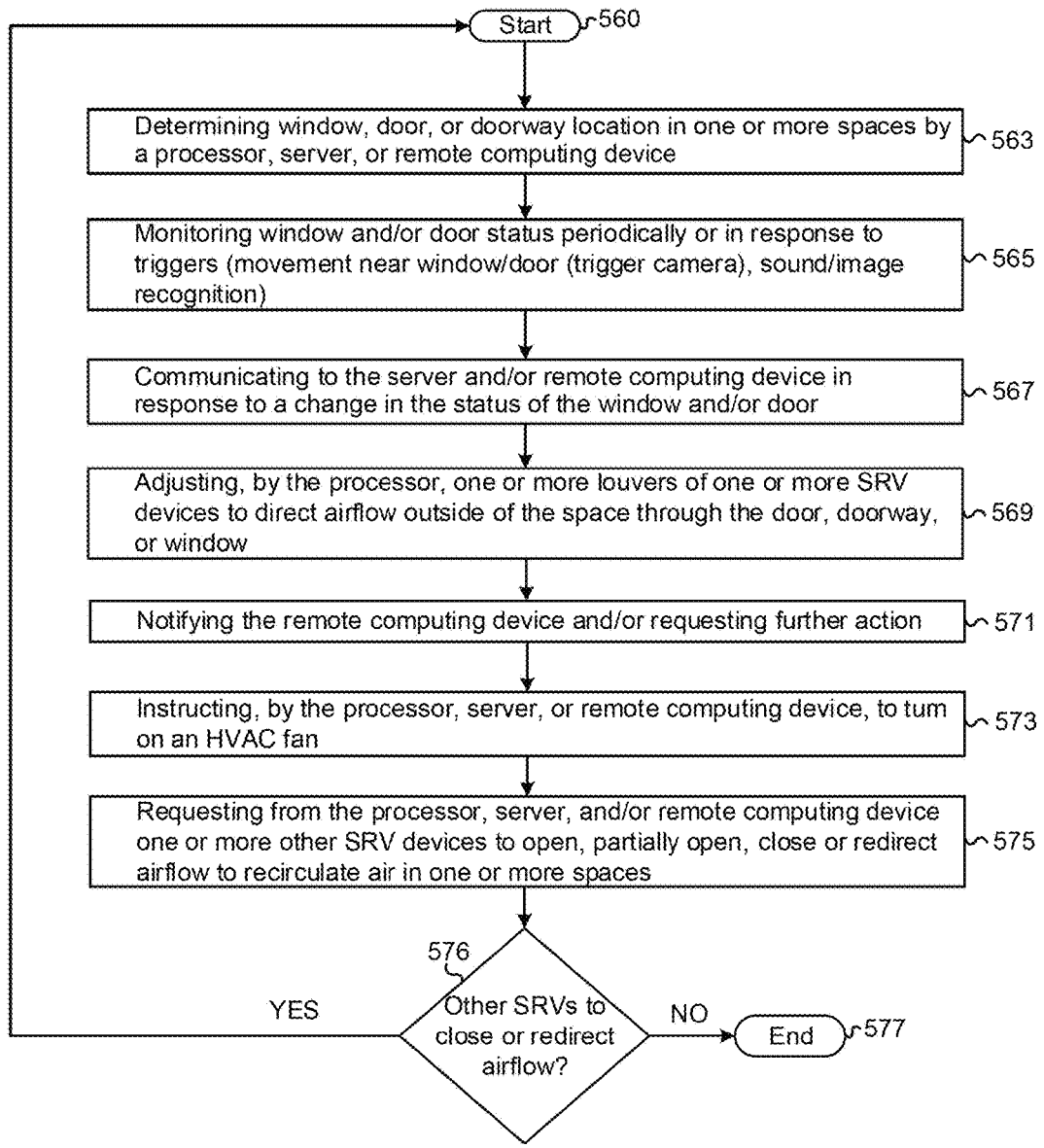
FIG. 5C illustrates an exemplary embodiment of a flowchart of interactions and operations of the SRV device of FIG. 1 based on yet another example of environmental features and conditions.

The SRV device 301 includes a processor 302 and memory/storage 303. The processor 302 may retrieve and execute instructions 304 and/or data 305 from memory/storage 303 to perform the processes of the present disclosure. Processor 302 may be a single processor, a multi-core processor, or multiple processors in different implementations. Referring to FIGS. 3-4, instructions and data for operating SRV device 301 may be stored on, transmitted from, or received by any computer-readable storage medium (e.g., memory/storage 412 of server 411) storing data (e.g., data 305) that is accessible to a processor (e.g., the processor of server 411) during modes of operation of the SRV 301. The SRV 301 may access and execute instructions 304 and/or data 305 stored on any remote computing device 431. The data 305 may be a method instruction as depicted in FIGS. 5A-5C. The method instructions are executable by processor 302, where the instructions include steps on how to operate and configure the louvers of the SRV device 301.

The memory/storage 303 may include a dynamic random-access memory (DRAM) and/or a read-only memory (ROM). Memory/storage 303 may provide a temporary location to store data 305 and instructions 304 retrieved and processed by processor 302. Memory/storage 303 may include a non-volatile read-and-write memory that stores data 305 and instructions 304, even when Wi-Fi/Internet is off, that may be retrieved and processed by processor 302. For example, memory/storage 303 may include magnetic, solid state and/or optical media, memory/storage 303 may be a single or multiple memory units as necessary. The memory/storage 303 stores all collected visual, audio, textual, voice, motion, heat, proximity, etc. information provided directly from the SRV device 301 or the sensor module(s) 350, or indirectly through a wireless connection to another electronic device(s), sensor(s), or sensor module(s) 350.

SRV device 301 couples to a network through a network interface 313. In some aspects, network interface 313 is a machine-interface. In this manner, the SRV device 301 may be a part of a network of computers, a local area network (LAN), a wide area network (WAN), or an Intranet, or a network of networks, for example, the Internet. A wireless controller 315 may be coupled to the processor 302. The wireless controller 315 may be further coupled to an antenna 380. The network module 311 may be integrated as system-in-package or system-on-chip device and/or collectively defined as having the network interface 313 and wireless controller 315. Network interface 313 and wireless controller 315 integrated into the network module 311 and being coupled to an antenna 380. Any or all components of SRV device 301 may be used in conjunction with the subject disclosure. The network interface 313 may include cellular interfaces, WiFi™ interfaces, Infrared interfaces, RFID interfaces, ZigBee interfaces, Bluetooth interfaces, Ethernet interfaces, coaxial interfaces, optical interfaces, or generally any communication interface that may be used for device communication.

A sensor module 350 may be communicably coupled to the SRV device 301. The sensor module 350 may be coupled to SRV device 301, formed on SRV device 301, or remotely connected to SRV device 301. The sensor module 350 may include and control various sensor components for sensing environmental conditions (e.g. temperature) and environmental features (e.g. location of furniture and individuals). Sensor components may monitor environmental conditions by using one or more condition sensors 355, and environmental features by using one or more feature sensors 356 (e.g. motion sensor 357, camera 358). A combination of sensor components may be implemented to provide comprehensive monitoring or improved accuracy in monitoring environmental features and conditions. Moreover, individual sensor components from sensor module 350 may be separately coupled to SRV device 301, formed on SRV device 301, or remotely connected to SRV device 301. In some embodiments, some sensor components may be grouped together to form a second or additional sensor modules. In certain embodiments, some sensor components of sensor module 350 (e.g. camera 357) may instead be formed on the SRV device 301. Further, in some embodiments, some sensor components of sensor module 350 (e.g. camera 357) may also be formed on the SRV device 301 to provide additional or supplemental monitoring.

Condition sensors 355 may detect and collect information about environmental conditions in a subspace 181-183, a space 100, a building or structure. Condition sensors 355 may include, for example, temperature sensor, ambient light sensor, humidity sensor, barometer sensor, air quality sensor (e.g. for detecting allergens, gas, pollution, pollen, etc.), infrared sensor, $CO_2$ sensor, CO sensor, piezoelectric sensor, airflow or airspeed sensor to determine air speed through HVAC system ducting and SRV device 301. The airflow or airspeed sensor may be used by the processor 302 of the SRV device 301 to determine how to distribute airflow in a space 100, how to adjust louvers 203 and 205, and how to control wind turbines to recharge batteries.

Feature sensors 356 may detect and collect information about environmental features in a subspace 181-183, a space 100, a building or structure. Feature sensors 356 may include, for example, a motion sensor 357, camera 358, and other sensors 359 (e.g. proximity sensor, occupancy sensor, ambient light sensor). Microphone 352 may also be used to detect features or verify the opening or closing of doors or windows in a space 100.

The sensor module 350 includes a controller 354 for controller the sensors and processing data collected by the sensors. Controller 354 may include a processor, memory/storage device (storing sensor instructions, settings, etc.), and a network module wireless chip for communicating with SRV device 301. Controller 354 may send measured/detected environmental conditions and features to the processor 302 for further processing. The sensor module 350 may be powered by a power supply 340. The power from the power supply 340 may be provide by disposable batteries or rechargeable batteries, for example, nickel cadmium (NiCd), lithium (Li), AA, AAA, and/or rechargeable capacitors, for example, supercapacitors (SC) or ultracapacitors. The power supply 340 may supply power to sensor module 350 by, for example, a power adapter for connecting to an outlet, a solar panels/cell, or any other renewable/alternative power supply source. The sensor module 350 may use multiple battery types, for example, using a coin cell battery to operate some sensor components or to provide auxiliary power.

The sensor module 350 may include a speaker 351 and microphone 352 for communicating with an individual 151 or receiving control commands from an individual 151 positioned within a vicinity of the SRV device 301. The speaker 351 and microphone 352 may be coupled to a CODEC 353. The coder/decoder (CODEC) 353 may also be coupled to the processor 302 through a controller 354. The processor 302 may provide audio information captured from the microphone 352 to any electronic device (e.g. server 411 or smart phone 432) as shown in FIG. 4, that may facilitate communication with an individual 151 positioned within a vicinity of the SRV device 301 through the speaker 351.

In an exemplary embodiment, the SRV device 301 and/or sensor module 350 comprises one or more motion sensors 357 for detecting motion information. For example, motion sensor 357 may detect moving objects and/or pedestrians. The motion sensor 357 may be a passive infrared motion detector. Infrared motion sensors are also known as PIR (passive infrared) motion sensors or simply PIR sensors. Such detectors have about a 120° arc and about a 50-foot range detection zone. In the case where an increased field of view of motion detection or more accurate motion detection is required, two or more motion detectors may be used.

Suitable alternate motion detectors may also be used, such as ultrasonic, optical, microwave, or video motion detectors. Additional alternative types of motion detectors may also be used to sense intrusion including laser scanning or frequency sensitive detectors, commonly referred to as "glass breaks". Motion sensor 357 may include image sensors having any type of low light level imaging sensors used for surveillance and unmanned monitoring in daylight to complete darkness, for example, low-light complementary metal-oxide-semiconductor (CMOS) or charge-coupled device (CCD) image sensors.

The motion sensor 357 may also be complemented with other devices to aid in detecting motion such as, for example, photocell sensors, cadmium-sulfide (CdS) cells, light-dependent resistors (LDR), and photoresistors. In addition to motion sensors, the photo cell sensors may be used to determine if there something in front of a sensor or a series of sensors that block light. The sensitivity of the motion sensor and photocell may be adjusted through, for example, an application on an electronic device (e.g. smart device 434 or laptop 431). Also, a server or application may decide if the situation or application warrants night use or twenty-four-hour operation of motion detection through alternate means such as photocell sensors. If night operation is selected, then the server or application will process detected photocell information to determine if motion was detected.

The sensor module 350 may include any number of other detectors or other sensors 359. Examples of other sensors 359 that may be used include, by way of illustration only and not by way of limitation, temperature sensors, video cameras, audio recorders, motion sensors, ambient light sensors, light sensors, humidity sensors, smoke detectors, and other sensors, such as for example, an Electric Field Proximity Sensing (EFPS) sensor to determine whether a person or object is nearby that is behind a wall.

The sensor module 350 may include a camera 358 for capturing visual information such as video and still images of the surrounding environment. The camera 358 may be coupled to a controller 354 for controlling the camera to capture visual information that may be sent to the processor 302. The controller 354 may be coupled to the processor 302 for processing visual information. The processor 302 may provide visual information captured from the camera 358 to any electronic device (e.g. server 411 or remote computing device 431) which may facilitate interaction or communication with a person or an object positioned within a vicinity of the SRV device 301. The camera 358 may be any optical instrument for recording or capturing images that may be stored locally, transmitted to another location, or both. The images may be still photographs, or sequences of images forming videos or movies. The camera 358 may be any type of camera, for example, high-end professional camera type, digital camera, panoramic camera, fish-eye lens type camera, multi-lens type camera, VR camera, etc.

The SRV 301 includes a power supply 390 having a power generator 391 as a power source. The power generator 391 may include rechargeable batteries, for example, nickel cadmium (NiCd), lithium (Li), AA, AAA, and/or rechargeable capacitors, for example, supercapacitors (SC) or ultracapacitors. The power generator 391 may comprise of multiple battery types, for example, using a coin cell battery to operate some sensor components or to provide auxiliary power, while using a rechargeable Li battery to provide power for operating louvers 203 and 205. Moreover, the power supply includes a power harvester 392 such as wind turbines/electric generator for charging rechargeable batteries or capacitors to prolong primary and/or auxiliary power by using wind turbines. The SRV 301 may be powered by rechargeable batteries, or wind turbines, or a combination of these and other power sources. In certain embodiments, the wind turbines may function in reverse to pull air out from the space. The processor 302 and/or controller 354 may periodically store and/or access data 305 and instructions 304 in memory 303 for determining how to effectively turn on wind turbines to charge rechargeable batteries when necessary.

The louver motion generator 370 may be powered using a power supply 390 and controlled through processor 302. The processor controls the louver motion generator 370 to slide, turn, or rotate louvers 203 and 205. The louver motion generator 370 may include a motor (e.g. a DC motor) or circuitry to for driving louvers 203 and 205 to move. In some embodiments, the louver motion generator 370 may be made to open or close using only power harvester 392.

FIG. 4 illustrates an exemplary embodiment of the SRV device 401 wirelessly communicating with other electronic devices through, for example, a wireless router 421. The electronic devices may be, for example, smart thermostats 441, laptops 433, portable devices 434, smart phones 432, and server 411 and/or server storage 412. SRV device may also connect to other smart home devices comprising of electronic door locks, light bulbs, smart switches, smart outlets, IP cameras, smoke detectors, smart refrigerators, smart washer/dryer, smart devices powered on solar energy, etc.

The SRV device 401 may be configured to wirelessly communicate and cooperate with smart thermostat 441 (and other smart devices) in real-time. Additionally, the SRV device 401 may communicate with smart thermostats 441 and other smart devices based on stored visual, motion, audio information, and/or environmental features and conditions in storage 402. The processor 302 and/or server 411 may adjust louvers 203 and/or 205 based on a measured physical quantity from the surrounding environment as collected by the smart thermostat 441 or smart device and stored as visual, motion, audio information, and/or environmental features and conditions in storage 412. Effectively, smart thermostat 441 and/or smart devices cooperate with or supplement sensor modules 350 to provide comprehensive information of environmental features and conditions in one or more subspaces 181-183 and spaces 100.

The SRV device 401 may be configured to communicate between the above electronic devices (e.g. security devices, smart thermostat, smart devices, or smart appliances) by sending and retrieving proximity information, schedule information, textual (e.g. email, SMS, MMS, text, etc.), visual, motion, or audio information, as well as user access information shared between electronic devices. For example, the SRV device 401 may be configured to be notified by these smart devices of exterior weather conditions, air quality, allergens/pollen, peak hours, etc. Notification may be made through text, email, visual, or audio information provided by remote computing devices 431, server 411, and/or smart thermostat 441 or any other electronic device mentioned above. Once a smart device (e.g. thermostat 441) detects an individual 151, environmental conditions and/or features may be relayed to the SRV device 401 and/or sensor modules 350, then to a server 411 or remote computing device 431 for requesting or determining an appropriate response. In this way, the SRV device 401 and/or sensor modules 350 act as a hub for collecting and processing environmental conditions and/or features from other electronic devices then prompting the server 411 or remote computing device 431 for control instructions to open, close, or partially open louvers 203 and/or 205 of one or more SRV devices 401.

FIGS. 5A-C illustrate exemplary methods of operating an SRV device. These exemplary methods are provided by way of example, as there are a variety of ways to carry out these methods. Each block shown in FIGS. 5A-5C represents one or more processes, methods or subroutines, carried out in the exemplary method. FIGS. 1-4 and 6 show exemplary embodiments of carrying out the methods of FIGS. 5A-5C for collecting and processing information, for illustration purposes only, FIG. 3 may be used to illustrate the processes of the exemplary method. The exemplary method may begin at block 500.

Referring to FIG. 5A, the exemplary method of using the SRV device 301 (e.g. operation using environmental features and conditions) begins at block 500, followed by block 503 of connecting one or more SRV devices 301 to an existing ducting of an HVAC system in a space, building, or structure. Each SRV device 301 may be fixed to the ducting by screws, or coupled to the ducting through an interface (e.g. by fixing to the drywall), or magnetically coupled to the ducting.

In block 505, the process continues with connecting one or more SRV devices 301 to a local wireless network through, for example, the network module 311 of the SRV device 301. The SRV device 301 may connect to a network of computers or smart devices 431, a local area network (LAN), a wide area network (WAN), or an Intranet, or a network of networks, for example, the Internet.

In block 507, the process continues with connecting one or more sensors to the one or more SRV devices 301 to provide the processor 302 with detected environmental conditions and/or features. The one or more sensors may be a sensor component of a sensor module 350. The one or more sensors may be directly attached to, or detachably coupled to, the one or more SRV devices 301. The one or more sensors may also be remotely connected to the SRV device 301 to provide the processor 302 with detected environmental conditions and/or features.

In block 509, the SRV device 301 is connected to a server 411 through the local network connection. The processor 302 may use the network module 311 to establish and save a single connection or multiple means of connecting to the server 411 (e.g. using WiFi, cellular connection, or by using any IEEE 802.11 standard). Moreover, a remote computing device 431 (e.g. smart phone, smart device, or portable device) may facilitate connection of the SRV device 301 to a server 411.

In block 511, the SRV device 301 is connected to a thermostat 441 through the local network connection. The processor 302 may use the network module 311 to establish and save a single connection or multiple means of connecting to the thermostat 441 (e.g. using WiFi, cellular connection, or by using any IEEE 802.11 standard). Moreover, a remote computing device 431 (e.g. smart phone, smart device, or portable device) may facilitate connection of the SRV device 301 to a thermostat 441. The SRV device 301 may communicate with thermostat 441 to turn on the HVAC system through a single action (e.g. user initiated action), set of actions (e.g. an algorithm or program), or a list or blend of actions based one or more environmental conditions and/or features, a proximity of a remote computing device 431 or individual 151, a time of day, visual, motion, or audio information, a schedule, user(s) preferences, and the state of the SRV device 301, as described in the present disclosure.

In block 513, the process continues by transmitting, using the one or more sensors of the sensor module 350, at least one detected environmental feature and condition of the space 100, building, or structure to the processor 302, server 411, or remote computing device 431. The sensors work together to detect, monitor, and transmit environmental features (e.g. sensors 356 to trace objects, features, and individuals 151 within a space 100 using a program or algorithm) and environmental conditions (e.g. sensors 355 to detect and monitor climate within space 100).

In block 514, the at least one detected environmental feature and condition is stored or updated in one or more databases. One or more databases may be used or created to store a category (e.g. time, room size, room name, season, power usage, peak usage times, inside and outside weather, user preferences, etc.) of detected environmental features and conditions, events, triggers, etc.

In block 515, the processor 302 or server 411 compares the at least one environmental feature and condition of the space 100, building, or structure with stored environmental features and conditions in a storage/memory device 303 of the one or more SRV devices 301, or a storage device 412 of the server 411.

In block 517, the process continues with the processor 302 adjusting one or more louvers 203 and/or 205 of the SRV device 301. Then, in block 519, the processor 302 and/or server 411 notify the remote computing device 431 and/or requesting further action from the remote computing device 431.

In block 521, the database(s) is updated with the detected environmental features and conditions and user preferences.

In block 523, the processor 302, server 411, or remote computing device 431 may communicate to another one or more SRV device to close or redirect airflow.

Referring to FIG. 5B, another exemplary method of using the SRV device 301 (e.g. directional heat/cool/fan by adjusting for obstructions or user preferences within space 100, building, or structure) begins at block 530, followed by block 533 of determining by a processor 302 or server 411 airflow obstructions within space 100. The individual 151 may also define obstructions within the space 100. The SRV device 301 may further include programming to learn individual 151 behavior and preferences to further aid in directing airflow in a subspace 181-183 or space 100. Unlike FIG. 5A, where SRV device 301 functions in a fully automated/autonomous mode, in FIG. 5B, the SRV device 301 operates in a semi-automatic mode functioning to move the louvers 203 and 205 around obstructions based on user conditioning and detected environmental features. The SRV device 301 adjusts louvers 203 and 205 for optimal delivery of airflow from heating, cooling, and/or fanning of a subspace 181-183 or space 100. Moreover, when it is not possible or effective to recirculate air in a space 100 or subspace 181-183 (e.g. space with floor register/vent installation and no windows/exterior doors), the SRV device 301 may recirculate air in the space 100 by periodically oscillating louvers 203 and/or 205. Further, to recirculate air in a space 100 or a subspace 181-183 with no exterior doors/windows, the louvers 203 and 205 may be adjusted to direct airflow outside of the space 100 through a doorway 161.

In block 535, the process continues with communicating to the server 411 and/or remote computing device 431 the status and location of airflow obstructions in the space 100.

In block 537, the processor 302, server 411, and/or remote computing device determine how or where to guide airflow from the HVAC ducting into the space 100.

In block 539, the process continues with the processor 302 adjusting one or more louvers 203 and/or 205 of the one or more SRV devices 301 to close, partially open, or periodically oscillate from an open to closed position to heat, cool, or circulate air in space 100.

In block 541, the exemplary method includes notifying the remote computing device 431 and/or requesting further action from the user or individual 151.

In block 543, the processor 302, server 411, or remote computing device 431 instruct thermostat 441 and/or HVAC system to turn on fanning, heating, or cooling of a subspace 181-183 or space 100.

In block 545, the processor 302, server 411, and/or remote computing device 431 requests one or more SRV devices 101-104 to open, partially open, or close to redirect airflow to heat, cool, or recirculate air in the space 100 based on obstructions, user preferences, learned individual 151 behavior and preferences, etc., for optimal delivery of airflow for heating, cooling, and/or fanning of a subspace 181-183 or space 100.

In block 546, additional SRV devices 301 may be accessed by the processor 302, server 411, and/or remote computing device 431 to provide optimal delivery of airflow for heating, cooling, and/or fanning of subspace 181-183 or space 100. Otherwise, the process of FIG. 5B ends at block 547.

Referring to FIG. 5C, another exemplary method of using the SRV device 301 (e.g. directing airflow to recirculating air within a space 100, building, or structure) begins at block 560, followed by block 563 of determining by a processor 302, server 411, and/or remote computing device 431 window (111, 113, 117), door (115, 163), and doorway 161 locations within space 100. The processor 302 and server 411 may use software or algorithms to trace features and objects within the space 100 and determine whether the object is an individual 151, window/door, furniture, opening, doorway, an adjacent room, etc. The user or individual 151 of a remote computing device 431 may also access the SRV 301 and/or server 411 to classify and define objects within a space 100.

In block 565, the process continues with monitoring the status of windows (111, 113, 117) and doors (115, 163) periodically or in response to triggers (e.g. movement near window/door triggers camera 358 to begin detecting open/closing of a window). Once the window (111, 113, 117), door (115, 163), and doorway 161 locations within space 100 are defined, then only those areas need to be monitored for specific motion, sound or pressure changes (e.g. from opening and closing the window), or image recognition. These triggers may be trained into sensor modules 350 or SRV device 301 to detect opening and closing of a door or window (e.g. training condition sensors 355 (e.g. pressure sensor), microphone 352 (sound), and motion sensors 357 to turn on HVAC fan, instead of using the camera 358 of SRV device 301 to detect a window opening). The individual 151 may also define opening and closing of a door/window (e.g. defining a trigger) within the space 100. The SRV device 301 may further include programming to learn individual 151 behavior and preferences to further aid in detecting opening or closing of a windows and doors in a subspace 181-183 or space 100.

In block 567, the sensor module 350 (or one or more sensors) and/or the SRV device 301 communicates to the server 411 and/or remote computing device 431, as well as various other smart devices, changes in the status of the window and/or door (e.g. window 113 or door 115).

In block 569, the process continues with the processor 302 adjusting one or more louvers 203 and/or 205 of the one or more SRV devices 301 to close, partially open, or periodically oscillate from an open to closed position to recirculate air and/or direct airflow outside of the space 100 through door 115, doorway 161, or windows 113, 111, and 117.

In block 571, the exemplary method includes notifying the remote computing device 431 and/or requesting further action from the user or individual 151.

In block 573, the processor 302, server 411, or remote computing device 431 may instruct thermostat 441 and/or HVAC system to turn on the fan for subspace 181-183 or space 100.

In block 575, the processor 302, server 411, and/or remote computing device 431 requests one or more SRV devices 101-104 to open, partially open, or close to redirect airflow to recirculate air in the space 100 based on SRV device 301 location, window, door, or doorway status/location in the space 100 or subspace 181-183. Other SRV devices 101-104 may be requested to periodically sweep subspaces 181-183 by oscillating louvers 203 and/or 205 from left to right (e.g. from an open position, to partially closed position and pointing towards a first direction, back to an open position, then to partially closed position and pointing towards a second direction opposite to the first direction).

In block 576, additional SRV devices 301 may be accessed by the processor 302, server 411, and/or remote computing device 431 to provide optimal delivery of airflow for recirculating air in subspace 181-183 or space 100. Otherwise, the process of FIG. 5B ends at block 577.

Definitions and Non-Limiting Language

A remote computing device may be a smart device, a smart phone, a vehicle, a tablet, a laptop, a TV, or any electronic device capable of wirelessly connecting to a network or joining a wireless network. The remote computing device may be wirelessly and communicably associated to an individual either through a network or server (e.g. through a user account on the server, or WiFi™ login information), or through visual information collected by the SRV device. The terms remote computing device, individual, and user may be used interchangeably throughout the present disclosure.

The server may be a computer that provides data to other computers. It may serve data to systems on a local area network (LAN) or a wide area network (WAN) over the Internet. The server may comprise of one or more types of servers (e.g. a web server or file server), each running its own software specific to the purpose of the server for sharing services, data, or files over a network. The server may be any computer configured to act as a server (e.g. a desktop computer, or single or multiple rack-mountable servers) and accessible remotely using remote access software.

Proximity determination may be made by using a combination of visual, motion, and audio information. The sensor modules, server, remote computing device, and/or SRV device may defined a virtual perimeter for a real-world geographic area. The SRV devices may also respond to geofencing triggers. Geofencing may be accomplished using location aware devices through, for example, GPS, RFID technology, wireless network connection information, cellular network connection information, etc. Visual, motion, and audio information may be collected by the SRV device or server to substantiate an individual(s)/remote computing device(s) physical location.

The network may be a network of computers, a local area network (LAN), a wide area network (WAN), or an Intranet, or a network of networks, for example, the Internet. Moreover, various interfaces may be used to connect to the network such as cellular interfaces, WiFi™ interfaces, Infrared interfaces, RFID interfaces, ZigBee interfaces, Bluetooth interfaces, Ethernet interfaces, coaxial interfaces, optical interfaces, or generally any communication interface that may be used for device communication. The purpose of the network is to enable the sharing of files and information between multiple systems.

The term "within a proximity", "a vicinity", "within a vicinity", "within a predetermined distance", and the like may be defined between about 10 meters and about 2000 meters. The term "coupled" is defined as connected, whether directly or indirectly through intervening components, and is not necessarily limited to physical connections. The connection may be such that the objects are permanently connected or releasably connected. The term "substantially" is defined to be essentially conforming to the particular dimension, shape, or other feature that the term modifies, such that the component need not be exact. For example, "substantially cylindrical" means that the object resembles a cylinder, but may have one or more deviations from a true cylinder. The term "comprising," when utilized, means "including, but not necessarily limited to"; it specifically indicates open-ended inclusion or membership in the so-described combination, group, series and the like.

The term "a predefined distance" may be defined as the distance of an approaching individual as the individual nears one or more SRV devices, or a traceable object used in determining environmental features and/or conditions. The predefined distance may be defined as between about 1 meter and about 2000 meters.

The processor of the SRV device, remoting computing device, or server may perform an action (e.g. first, second, third, etc.) comprising of a single action, set of actions, or a list or blend of actions based on one or more of: a proximity of an individual(s) or remote computing device(s), a time of day, environmental conditions and/or features, visual, motion, or audio information, a schedule, user(s) preferences, and the state of the louvers of the SRV device, as described above. The action may be any one of: opening the louvers, closing the louvers, or partially opening the louvers, alternately opening horizontal and vertical louvers, and opening and closing horizontal and/or vertical louvers by oscillating from open to close (e.g. from about 0° to about 180°). The action may also include playing a music file, sound file, greeting, or message in response to a detected change in occupancy and/or environmental conditions and/or features, or in response to a detected or defined audio, proximity, visual, or motion trigger. The action may also comprise of controlling other smart devices as communicated through the SRV device or server, for example, turning on a light fixture, outlet, and communicating with remote computing device(s) or detected individual(s). The action may also comprise of sending an email, text, or SMS to a server, smart devices, or remote computing device(s).

The louvers of an SRV device being partially opened may be defined by a percentage of openness of between about 1-99%. Where partially opening the louvers to about 99% means the SRV device is about completely open, and partially opening the louvers to about 1% means the SRV device is about completely closed. In response to any of the above actions, the action may also comprise of closing the SRV device or closing sensor cover for safety, privacy, or security. The server, user, remote computing device may perform any action or series of actions to achieve convenience, safety, security, or privacy for the user, resident, or tenant.

Those of skill in the art will appreciate that the foregoing disclosed systems and functionalities may be designed and configured into computer files (e.g. RTL, GDSII, GERBER, etc.) stored on computer-readable media. Some or all such files may be provided to fabrication handlers who fabricate devices based on such files. Resulting products include semiconductor wafers that are separated into semiconductor dies and packaged into semiconductor chips. The semiconductor chips are then employed in devices, such as, an IoT system, the SRV device, or a combination thereof.

Those of skill would further appreciate that the various illustrative logical blocks, configurations, modules, circuits, and algorithm steps described in connection with the embodiments disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor may read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor, and the storage medium may reside as discrete components in a computing device or user terminal.

Further, specific details are given in the description to provide a thorough understanding of the embodiments. However, embodiments may be practiced without these specific details. For example, well-known circuits, processes, algorithms, structures, and techniques have been shown without unnecessary detail to avoid obscuring the embodiments. This description provides example embodiments only and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Where applicable, various embodiments provided by the present disclosure may be implemented using hardware, software, or combinations of hardware and software. In addition, where applicable, the various hardware components and/or software components, set forth herein, may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software or application, in accordance with the present disclosure, such as program code and/or data, may be stored on one or more computer-readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code may be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the present disclosure, the disclosure, the present disclosure, other variations thereof and alike are for convenience and do not imply that a disclosure relating to such phrase(s) is essential to the present disclosure or that such disclosure applies to all configurations of the present disclosure. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

The embodiments shown and described above are only examples. Many details are often found in the art such as the other features of an image device. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed:

1. A smart register vent (SRV) device comprising:
at least one memory;
a processor, coupled to the at least one memory;
one or more sensors, wherein at least one of the one or more sensors is exterior to an SRV device housing and communicable to the processor;
wherein a first sensor of the one or more sensors detects changes in space information, individual information, or both, in a surrounding environment;
one or more louvers, the one or more louvers being electronically adjustable;
wherein the processor causes the one or more louvers to adjust based on instructions stored on the at least one memory,
identifying the location of one or more windows, doors, openings, or doorways in a space;
wherein the processor utilizes the space information and the individual information, in the surrounding environment, to determine how to adjust the one or more louvers;
wherein the processor, in response to changes in the space information, the individual information, or both, causes the one or more louvers to adjust and direct airflow through the one or more windows, doors, openings, or doorways to circulate air in the space; and
wherein the processor stores the changes of the space information, the individual information or both, in the at least one memory, and causes the one or more louvers to adjust in response to new changes in the space information, the individual information or both.

2. The SRV device of claim 1, wherein the one or more sensors is one of a speaker, a microphone, a camera, temperature sensor, occupancy sensor, humidity sensor, $CO_2$ sensor, air quality sensor, or a motion sensor and wherein the one or more sensors acquire the space information and the individual information.

3. The SRV device of claim 2, further comprising a network module, the network module coupling the SRV device to a local wireless network and to one or more other SRV devices.

4. The SRV device of claim 3, wherein alternatively the processor receives the instruction from a server or the one or more other SRV devices.

5. The SRV device of claim 4, further comprising one or more sensor covers for covering the one or more sensors and wherein the one or more sensor covers are configured by the processor.

6. The SRV device of claim 2, wherein the one or more louvers are positioned along one of a vertical direction, a horizontal direction or an angled direction and wherein to adjust the one or more louvers is to position the one or more louvers to an open position, a closed position, a partially open position or a partially closed position in the vertical direction, the horizontal direction or the angled direction, and wherein the one or more louvers are made to oscillate from partially open to partially closed to recirculate air in a space.

7. The SRV device of claim 6, wherein the individual information comprises of: size, build, temperature, and number of individuals in the surrounding environment, and wherein the space information comprises of: furniture type and location, status and location of objects, windows and doors, and openings in the surrounding environment.

8. The SRV device of claim 7, wherein the space information and the individual information are compared against a database of stored space information and stored individual information on the server or the at least one memory of the SRV device to determine the changes of the space information, the individual information or both.

9. The SRV device of claim 8, wherein a user is prompted to approve updating of the database with the space information acquired by the one or more sensors, the individual information acquired by the one or more sensors or both.

10. The SRV device of claim 8, wherein user preferences stored in the database are checked prior to adjusting the one or more louvers of the SRV device in response to changes in the space information, the individual information or both.

11. The SRV device of claim 10, wherein a second sensor of the at least one of the one or more sensors is integrated within the SRV device.

12. The SRV device of claim 11, further comprising a magnetic faceplate, wherein the magnetic faceplate is coupled to the front face of the SRV.

13. A method comprising:
detecting, by one or more sensors, a first action within a surrounding environment;
communicating the first action to a smart register vent (SRV) device;
identifying the location of one or more windows, doors, openings, or doorways in a space and directing airflow through the one or more windows, doors, openings, or doorways in the space;
wherein the first action comprises of determining changes in space information, individual information, or both, in the surrounding environment; and
performing a second action, by the SRV, based on the determining.

14. The method of claim 13, wherein the second action is at least one of adjusting one or more louvers of the SRV device to an open position, a closed position, a partially open position or partially closed position.

15. The method of claim 14, wherein detecting the first action within the surrounding environment utilizes space information and individual information, in the surrounding environment, to determine how to adjust the one or more louvers.

16. The method of claim 15, wherein the first action further comprises of acquiring both the space information and the individual information of the surrounding environment; wherein the individual information comprises of: size, build, temperature, and number of individuals in the surrounding environment, and the space information comprises of: furniture type and location, SRV status and location of objects, windows and doors, and openings in the surrounding environment.

17. The method of claim 16, wherein determining changes in the space information and the individual information is to compare the space information and the individual information acquired by the one or more sensors to a stored space information and stored individual information in a database.

18. The method of claim 17, further comprising of storing in the database, the space information acquired by the one or more sensors, the individual information acquired by the one or more sensors, or both; wherein the database is stored on a server or an at least one memory of the SRV device.

19. The method of claim 18, further comprising of checking user preferences stored in the database prior to performing the second action.

20. The method of claim 14, wherein the one or more louvers are made to oscillate from partially open to partially closed to recirculate air in a space.

21. The method of claim 18, wherein the stored space information and the stored individual information in the database is updated with the space information and the individual information acquired by the one or more sensors.

22. The method of claim 21, wherein a user is prompted to approve updating of the database with the space information and the individual information acquired by the one or more sensors.

23. The method of claim 22, wherein at least one of the one or more sensors is integrated within the SRV device.

* * * * *